United States Patent
Choi et al.

(10) Patent No.: US 12,238,364 B2
(45) Date of Patent: Feb. 25, 2025

(54) APPARATUS AND METHOD FOR PROVIDING MULTIMEDIA CONTENT

(71) Applicant: SAMSUNG ELECTRONICS CO., LTD., Suwon-si (KR)

(72) Inventors: Yeongjune Choi, Suwon-si (KR); Jaein Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/148,279

(22) Filed: Dec. 29, 2022

(65) Prior Publication Data

US 2023/0135354 A1    May 4, 2023

Related U.S. Application Data

(63) Continuation of application No. PCT/KR2022/000509, filed on Jan. 12, 2022.

(30) Foreign Application Priority Data

Jan. 13, 2021   (KR) ........................ 10-2021-0004764

(51) Int. Cl.
*H04N 21/431* (2011.01)
*H04N 21/845* (2011.01)
*H04N 21/8549* (2011.01)

(52) U.S. Cl.
CPC ..... *H04N 21/4312* (2013.01); *H04N 21/8456* (2013.01); *H04N 21/8549* (2013.01)

(58) Field of Classification Search
None
See application file for complete search history.

(56) References Cited

U.S. PATENT DOCUMENTS 9,141,860 B2 *  9/2015  Vunic .................. G11B 27/034
9,483,475 B2   11/2016  Tuffet Blaise et al.
(Continued)

FOREIGN PATENT DOCUMENTS

KR    10-2015-0112535 A    10/2015
KR    10-2016-0092256 A    8/2016
(Continued)

OTHER PUBLICATIONS

International Search Report and Written Opinion of the International Searching Authority dated Apr. 29, 2022, in connection with International Application No. PCT/KR2022/000509, 8 pages.

*Primary Examiner* — Alexander Q Huerta

(57) ABSTRACT

An electronic device may include: a display; at least one processor operatively connected with the display; and a memory configured to store a plurality of contents and operatively connected with the at least one processor, and the memory may store instructions that, when being executed, cause the at least one processor to: acquire a plurality of contents related to a first category from the memory; classify the plurality of contents into one or more groups, based on context information of the plurality of contents; identify at least one first content corresponding to a designated type from the one or more groups; generate a highlight content by using the at least one first content; generate a teed including the highlighted content and the plurality of contents, based on the one or more groups; and arrange the highlight content on an upper end of the feed to output on the display.

20 Claims, 21 Drawing Sheets

(56) References Cited

U.S. PATENT DOCUMENTS

| | | | |
|---|---|---|---|
| 9,866,887 B2 | 1/2018 | Guo et al. | |
| 9,886,454 B2 * | 2/2018 | Cho et al. | |
| 9,942,591 B2 * | 4/2018 | Stribling | H04N 21/2743 |
| 10,032,483 B2 | 7/2018 | Ryu et al. | |
| 10,073,584 B2 | 9/2018 | Miura et al. | |
| 2011/0074824 A1 | 3/2011 | Srinivasan et al. | |
| 2014/0328570 A1 | 11/2014 | Cheng et al. | |
| 2015/0082172 A1 * | 3/2015 | Shakib | G06F 16/48 |
| | | | 715/731 |
| 2015/0278605 A1 | 10/2015 | Seo et al. | |
| 2016/0027476 A1 * | 1/2016 | Shimokawa | H04N 23/63 |
| | | | 386/241 |
| 2016/0070962 A1 | 3/2016 | Shetty et al. | |
| 2018/0301169 A1 * | 10/2018 | Ricciardi | G11B 27/036 |
| 2019/0171883 A1 | 6/2019 | Matias et al. | |
| 2019/0251363 A1 | 8/2019 | Kim | |
| 2019/0341027 A1 * | 11/2019 | Vescovi | G10L 15/1815 |
| 2019/0370282 A1 | 12/2019 | Vergnaud et al. | |
| 2021/0136467 A1 | 5/2021 | Kim et al. | |
| 2023/0135354 A1 * | 5/2023 | Choi | H04N 21/8456 |
| | | | 725/39 |
| 2023/0336671 A1 * | 10/2023 | Yoshizawa | G06V 20/70 |

FOREIGN PATENT DOCUMENTS

| | | |
|---|---|---|
| KR | 10-2017-0133618 A | 12/2017 |
| KR | 10-1804383 B1 | 12/2017 |
| KR | 10-2019-0118415 A | 10/2019 |

* cited by examiner

Chapter A (310)

Set A-1 (311)

Set A-2 (312)

Set A-Others (313)

Chapter B (320)

Set B-1 (321)

Set B-2 (322)

Chapter C (330)

Set C-1 (331)

Set C-Others (332)

ETC (340)

Set ETC-1 (341)

Set ETC-Others (342)

APPARATUS AND METHOD FOR PROVIDING MULTIMEDIA CONTENT

CROSS-REFERENCE TO RELATED APPLICATIONS

This application is a Bypass Continuation of International Application No. PCT/KR2022/000509, filed Jan. 12, 2022, which claims priority to Korean Patent Application No. 10-2021-0004764, filed Jan. 13, 2021, the disclosures of which are herein incorporated by reference in their entirety.

BACKGROUND

1. Field

Various embodiments disclosed in the present document relate to a technique for providing a multimedia content in an electronic device.

As the use of portable terminals has become popular thanks to the recent development of mobile communication technology, services or functions provided through a display of a portable terminal have been diversified. For example, a gallery application of a portable terminal does not only provide multimedia contents such as images, video stored in the portable terminal on a display, but also automatically generates multimedia contents having common context information in a virtual list or edits as a new video file, and provides them.

2. Description of Related Art

Multimedia contents stored in a portable terminal may be provided in various methods, but mostly contents in a virtual album automatically generated according to a specific subject may be arranged within the same layout in chronological order without being processed separately. Accordingly, there is a limit to causing interest of a user.

Accordingly, in various embodiments of the present document, multimedia contents related to a specific category may be classified into one or more groups based on context information, and a new highlight image may be generated by combining and editing highlight sections extracted from the respective groups. In addition, various embodiments for efficiently providing the generated highlight image along with the multimedia contents may be provided.

The technical objects to be achieved by embodiments disclosed in the present document are not limited to those mentioned above, and other technical objects that are not mentioned above may be clearly understood to those skilled in the art based on the descriptions provided below.

SUMMARY

According to an embodiment disclosed in the present document, an electronic device may include: a display; at least one processor operatively connected with the display; and a memory configured to store a plurality of contents and operatively connected with the at least one processor, and the memory may store instructions that, when being executed, cause the at least one processor to: acquire a plurality of contents related to a first category from the memory; classify the plurality of contents into one or more groups, based on context information of the plurality of contents; identify at least one first content corresponding to a designated type from the one or more groups; generate a highlight content by using the at least one first content; generate a feed including the highlighted content and the plurality of contents, based on the one or more groups; and arrange the highlight content on an upper end of the feed to output on the display.

According to an embodiment disclosed in the present document, an operating method of an electronic device may include: acquiring a plurality of contents related to a first category; classifying the plurality of contents into one or more groups, based on context information of the plurality of contents; identifying at least one first content corresponding to a designated type from the one or more groups; generating a highlight content by using the at least one first content; generating a feed including the highlighted content and the plurality of contents, based on the one or more groups; and arranging the highlight content on an upper end of the feed to output.

According to various embodiments disclosed in the present document, a plurality of contents related to a specific category may be generated as a virtual album and may be provided to a user. In addition, the plurality of contents may be classified into one or more groups based on context information of the contents, and the contents may be provided by using various layouts considering characteristics of each content on the basis of the classified groups, so that user experience is improved.

Various other effects that may be directly or indirectly grasped through the present document may be provided.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CI)), a digital video disc (DVI)), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Regarding explanations of the drawings, the same or similar reference numerals may be used for the same or similar components.

DETAILED DESCRIPTION

Hereinafter, various embodiments disclosed in the present document will be described with reference to the accompanying drawings. However, these do not limit the disclosure to a specific embodiment, and should be understood as including various modifications, equivalents, and/or alternatives of the disclosure.

Figure 1:
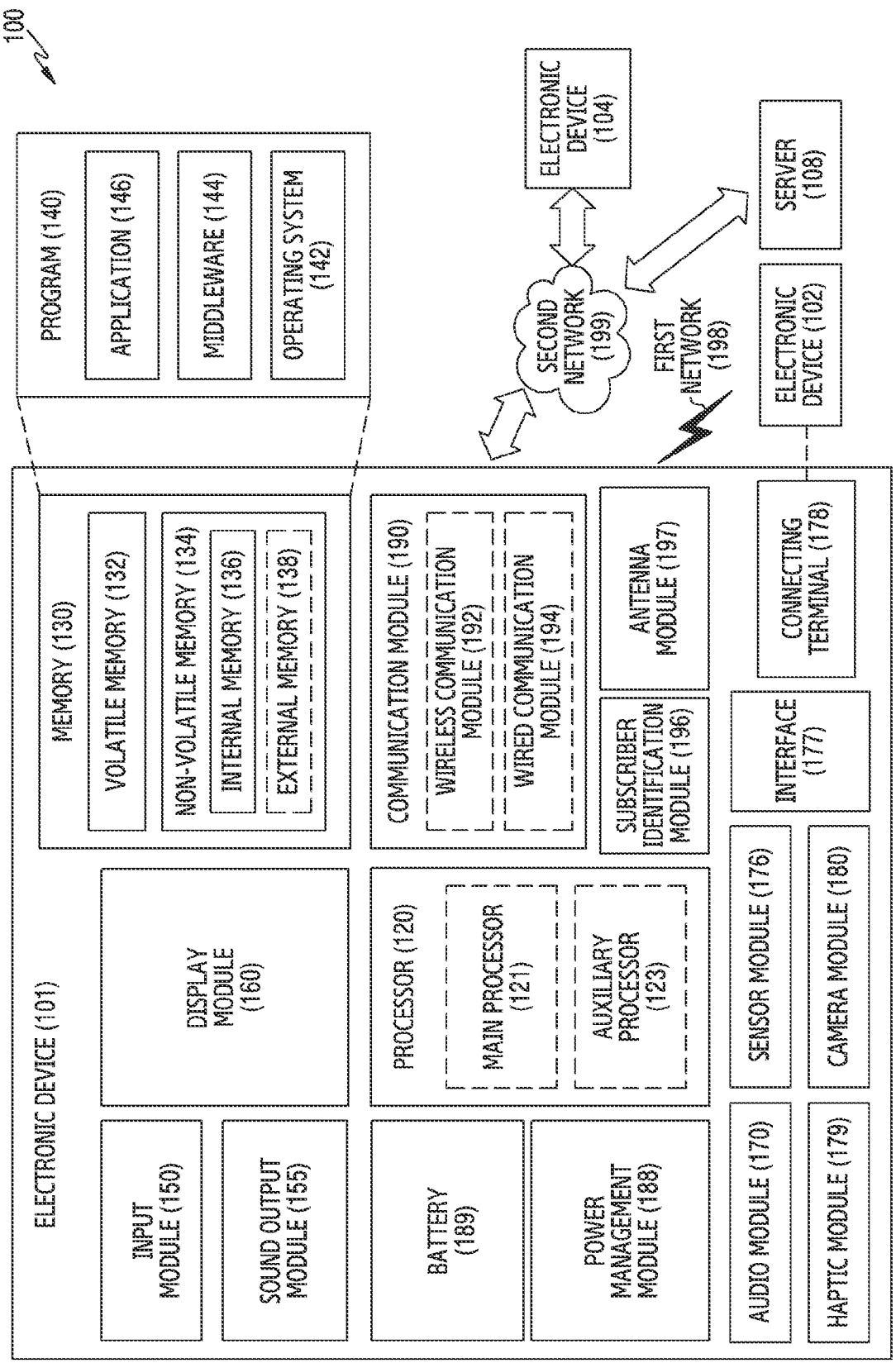
FIG. 1 illustrates a block diagram of an electronic device in a network environment according to an embodiment.

FIG. 1 illustrates a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include; for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, are infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module, According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108, For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
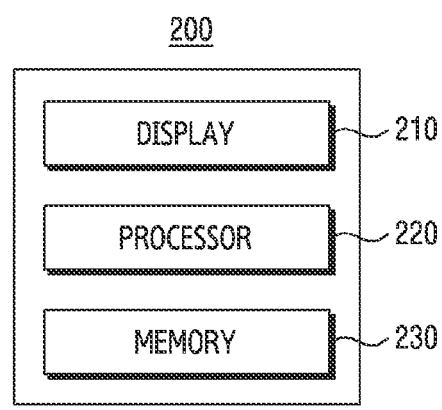
FIG. 2 illustrates a block diagram of an electronic device according to an embodiment.

FIG. 2 illustrates a block diagram of an electronic device according to an embodiment.

Referring to FIG. 2, the electronic device 200 is a device that outputs multimedia contents that the device acquires by directly photographing or receives from an external electronic device (for example, the external electronic device 102, 104 of FIG. 1) in various methods, and may include a display 210, at least one processor 220, or a memory 230. In FIG. 2, the electronic device 200 may correspond to the electronic device 101 shown in FIG. 1.

In an embodiment, the display 210 (for example, the display module 160 of FIG. 1) may display a content stored in the memory 230 of the electronic device 200. The content may indicate a data file having an image or video format.

In an embodiment, the memory 230 (for example, the memory 130 of FIG. 1) may store contents that the electronic device 200 directly photographs by using a camera (for example, the camera module 180 of FIG. 1) or acquires from an external electronic device through a communication module (for example, the communication module 190 of FIG. 1). According to various embodiments, the memory 230 may store instructions that, when being executed, controls the at least one processor 220 (for example, the processor 120 of FIG. 1) to perform various operations. For example, the at least one processor 220 may perform operations for configuring one feed with similar contents according to a designated subject, and for providing a highlight content showing a summary of contents in the feed, along with the contents.

In an embodiment, the at least one processor 220 may acquire a plurality of contents related to a first category from the memory 230. The first category may indicate a common subject of contents for configurating a feed, and may be identified by person, pet, travel, landscape, food, daily life, special day, growth diary, or a combination thereof, and may not be limited to one subject. According to various embodiments, when it s identified that the contents related to the first category are stored in the memory 230 in excess of a designated number, the at least one processor 220 may acquire the plurality of contents related to the first category from the memory 230. For example, when it is identified that contents recognized as containing the same person are created with 10 or more photos taken for one year, or contents including the same food are created with 20 or more photos taken for 3 months, the at least one processor 220 may extract the identified contents from the memory 230 and may generate a feed related to the corresponding person or food. In another example, when 10 or more photos taken at two or more positions more than 50 km away from home are identified, or contents created in two or more countries are identified, the at least one processor 220 may extract, from the memory 230, contents created for a period from the time that a user of the electronic device 200 leaves user's house to the time that the user comes back home, and may generate a feed related to domestic travel or overseas travel.

In an embodiment, the at least one processor 220 may classify the plurality of contents into one or more groups, based on context information of the acquired plurality of contents. The context information may include at least one of a time, a place, a point of interest (POI), a user tag, or a type (format) of content related to each of the plurality of contents. For example, the at least one processor 220 may classify a plurality of contents acquired in relation to the same person (for example, baby) into one or more groups according to photographing dates. In another example, the at least one processor 220 may classify a plurality of contents acquired in relation to overseas travel into one or more groups according to photographing places (for example, a country, a state or a city).

According to various embodiments, the at least one processor 220 may classify the plurality of contents into one or more large groups based on a first context of the context information. The at least one processor 220 may classify one or more contents included in each of the one or more large groups into one or more small groups, based on a second context which is different from the first context. For example, the at least one processor 220 may classify a plurality of contents related to 'baby' into one or more large groups according to photographing dates, and may classify the one or more large groups into one or more small groups according to photographing places or actions. In another example, the at least one processor 220 may classify a plurality of contents related to 'overseas travel' into one or more large groups according to cities, and may classify the one or more large groups into one or more small groups according to photographing dates. In the process of classifying, a content of the plurality of contents that does not have a common context to the other contents may not be classified into any one group, A content that does not belong to the large group or the small group may be treated as one group in itself.

In an embodiment, the at least one processor 220 may identify at least one first content corresponding to a designated type from the one or more classified groups. The first content may be a content in which a highlight section is identified among contents of video format. The highlight section may be a section in which a change of a least one of an action, a gesture, an emotion, or a sound in the content is detected. According to various embodiments, the at least one processor 220 may analyze a highlight section with respect to a content of a video format in advance, and may display the content in which the highlight section is identified through the analysis by using a tag or a flag.

In an embodiment, the at least one processor 220 may generate a highlight content by using the at least one first content. According to various embodiments, the at least one processor 220 may extract the highlight section from the at least one first content, and may generate the highlight content by combining the at least one extracted highlight section. The at least one processor 220 may apply an effect such as zoom-in, a speed change to each of the at least one highlight section, and may insert music that is well suited to the first category to the highlight content. The at least one processor 220 may generate the highlight content according to a time length (for example, 40 seconds, 1 minute, etc.) designated by the user.

In an embodiment, the at least one processor 220 may generate a feed including the highlight content and the plurality of contents, based on the one or more groups. The at least one processor 220 may generate a layout for each of the one or more classified groups, and may generate the feed by appropriately arranging the plurality of contents in the generated layouts. According to various embodiments, the at least one processor 220 may determine a priority of each of the one or more classified groups, and may determine an arrangement order of the plurality of contents according to the determined priority. For example, the at least one processor 220 may determine a priority of each of the one or more small groups, based on whether the at least one first content is included or a content generated time. The at least one processor 220 may determine a highest priority for a first small group that has the earliest content generated time among the small groups including the at least one first content. The at least one processor 220 may determine priorities of the other small groups except for the first small group among the one or more small groups, based on content generated times. On the assumption that a large group X includes small groups A, B including the first content, and a small group C without including the first content, the at least one processor 220 may identify that the small group A and the small group B include the first content, and may identify generated times of the small groups A, B. A generated time of each group may be determined with reference to a content that has the earliest generating (photographing) time among contents included in the group. When it is identified that the generated time of the small group A is earlier than the generated time of the small group B as a result of identifying, the at least one processor 220 may determine that the small group A has a highest priority in the large group X. The at least one processor 220 may determine priorities of the other small groups B, C except for the small group A, according to generated times. When it is identified that a generated time of the small group C is earlier than a generated time of the small group B, the at least one processor 220 may determine a higher priority of the small group C than that of the small group 13. The priority of the one or more large groups may be determined based on generated times. According to various embodiments, the at least one processor 220 may determine an arrangement order of the one or more small groups in the large group according to the determined priority. For example, the arrangement order of the small groups may be determined in the large group X in order of the small group A, the small group C, and the small group B according to the determined priority. In addition, the at least one processor 220 may arrange the first content included in the small group A having the highest priority in the large group X on an uppermost end, and may determine an arrangement order of the other contents according to generated times.

According to various embodiments, the at least one processor 220 may determine a layout for one or more contents included in each of the one or more groups, based on the determined arrangement order and a content characteristic. The content characteristic may include at least one of a type (format), a shape, a ratio of the content, a content identifier, or the number of contents included in the corresponding small group. The at least one processor 220 may determine how to arrange the contents in a frame by considering a characteristic of each content, while arranging the plurality of contents according to the determined arrangement order. For example, on the assumption that three contents are included in the small group A, the at least one processor 220 may determine a layout based on respective shapes of the three contents. When one content of the three contents has a square shape and the two contents have a landscape shape, the at least one processor 220 may determine to arrange the three contents in different frames. When all of the three contents have portrait shapes, the at least one processor 220 may determine to arrange the three contents in one frame. According to various embodiments, the at least one processor 220 may determine to arrange contents on different positions in a frame according to the last digit of the identifier of each content in order to prevent the plurality of contents from being arranged uniformly and monotonously. For example, when the last digit of the identifier of a content is '1', the content may be arranged to be aligned with the center in the frame. When the last digit of the identifier of a content is '2', the content may be arranged to be aligned with the left side in the frame. According to various embodiments, the at least one processor 220 may display a user tag or a POI related to each content along with the content in the frame. The user tag or the POI may be displayed overlapping one corner of the content or may be displayed in a margin in the frame.

In an embodiment, the at least one processor 220 may arrange the highlight content on an upper end of the feed, and may arrange the plurality of contents on a position exposed subsequent to the highlight content, and may output the feed on the display 210. The plurality of contents may be arranged on the position subsequent to the highlight content within the feed according to the determined arrangement order and the determined layout.

FIGS. 3A, 3B, 3C, and 3D illustrate methods for classifying a plurality of contents into one or more groups and determining an arrangement order according to an embodiment. In FIGS. 3A to 3D, a process of, when a designated condition is satisfied, acquiring a plurality of contents 300 from a memory (for example, the memory 130 of FIG. 1 or the memory 230 of FIG. 2) of an electronic device (for example, the electronic device 101 of FIG. 1 or the electronic device 200 of FIG. 2), and classifying the acquired plurality of contents 300 into a large group and a small group according to context information will be described. For example, the designated condition may refer to a condition where a content related to a specific category is photographed or stored in excess of a designated number for a designated period. In FIGS. 3A to 3D, the plurality of contents 300 may be identified as contents 1 to 25, based on an order according to generated times.

Figure 3A:
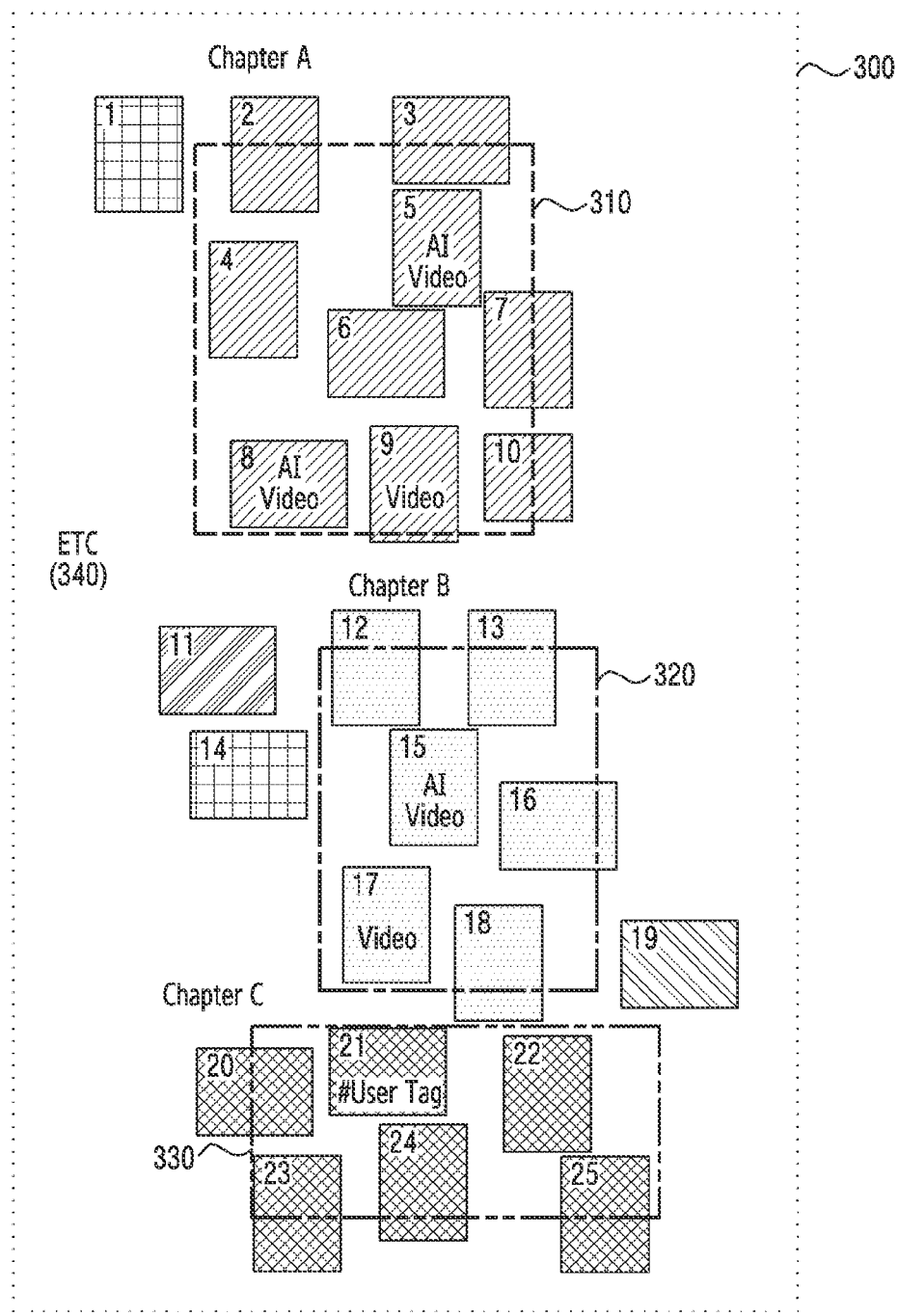
FIGS. 3A, 3B, 3C, and 3D illustrate methods for classifying a plurality of contents into one or more groups and determining an arrangement order according to an embodiment.

Referring to FIG. 3A, the electronic device 200 may classify the plurality of contents 300 into one or more chapters, based on context information. The context information may include at least one of a time, a place, a POI, or a user tag related to each of the plurality of contents. In an embodiment, when a plurality of contents related to baby are acquired, the electronic device 200 may classify the plurality of contents into one or more chapters according to photographing dates. When a plurality of contents related to overseas travel are acquired, the electronic device 200 may classify the plurality of contents into one or more chapters according to photographing places (for example, a country, a state, or a city). In FIG. 3A, the electronic device 200 may classify contents 2, 3, 4, 5, 6, 7, 8, 9 10 into chapter A 310, may classify contents 12, 13, 15, 16, 17, 18 into chapter B 320, and may classify contents 20, 22, 23 24, 25 into chapter C 330. Contents 1, 11, 14, 19 that are not classified into any of chapter A, B, or C may be classified into separate chapter ETC 340. According to various embodiments, the electronic device 200 may classify one or more contents included in each of the one or more chapters into one or more sets according to a context different from the classification criterion of the one or more chapters.

Figure 3B:
Figure 3B:
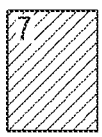
Figure 3B:
Figure 3B:
Figure 3B:
Figure 3B:
Figure 3B:
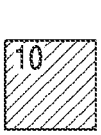
Figure 3B:
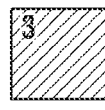
Figure 3B:
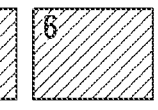
Figure 3B:
Figure 3B:
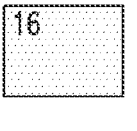
Figure 3B:
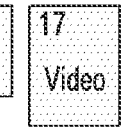
Figure 3B:
Figure 3B:
Figure 3B:
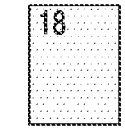
Figure 3B:
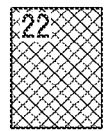
Figure 3B:
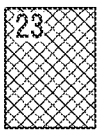
Figure 3B:
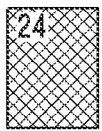
Figure 3B:
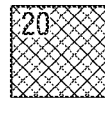
Figure 3B:
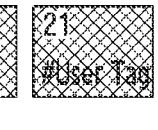
Figure 3B:
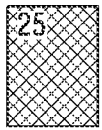
Figure 3B:
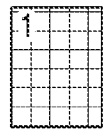
Figure 3B:
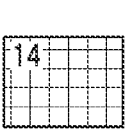
Figure 3B:
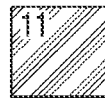
Figure 3B:
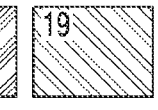

Referring to FIG. 3B, the electronic device 200 may classify contents that are determined to have similarity by analyzing the POI or tag of one or more contents included in each of the one or more chapters, into the same set. In an embodiment, the electronic device 200 may classify the contents 2, 7, 8 among the contents included in the chapter A 310 into set A-1 311, and may classify the contents 4, 5, 9, 10 into set A-2 312. The contents 3, 6 that do not have the common POI or tag and are not classified into the set A-1 311 or the set A-2 312 may be classified into set A-others 313. In an embodiment, the electronic device 200 may classify the contents 12, 16, 17 among contents included in the chapter B 320 into set B-1 321, and may classify the contents 13, 15, 18 into set 322. In an embodiment, the electronic device 200 may classify the contents 22, 23, 24 among contents included in the chapter C 330 into set C-1 331, and may classify the other contents 20, 21, 25 that do not have a common POI or tag into set C-others 332. In an embodiment, when the contents 1, 14 are determined to have similarity through analysis of POI or tag among contents of the chapter ETC 340, the electronic device 200 may classify the contents 1, 14 into set ETC-1 341. The contents 11, 19 that do not have similarity among the contents of the chapter ETC 340 may be classified into set ETC-others 342. The result of classifying the plurality of contents may be illustrated in FIG. 3C.

Figure 3C:
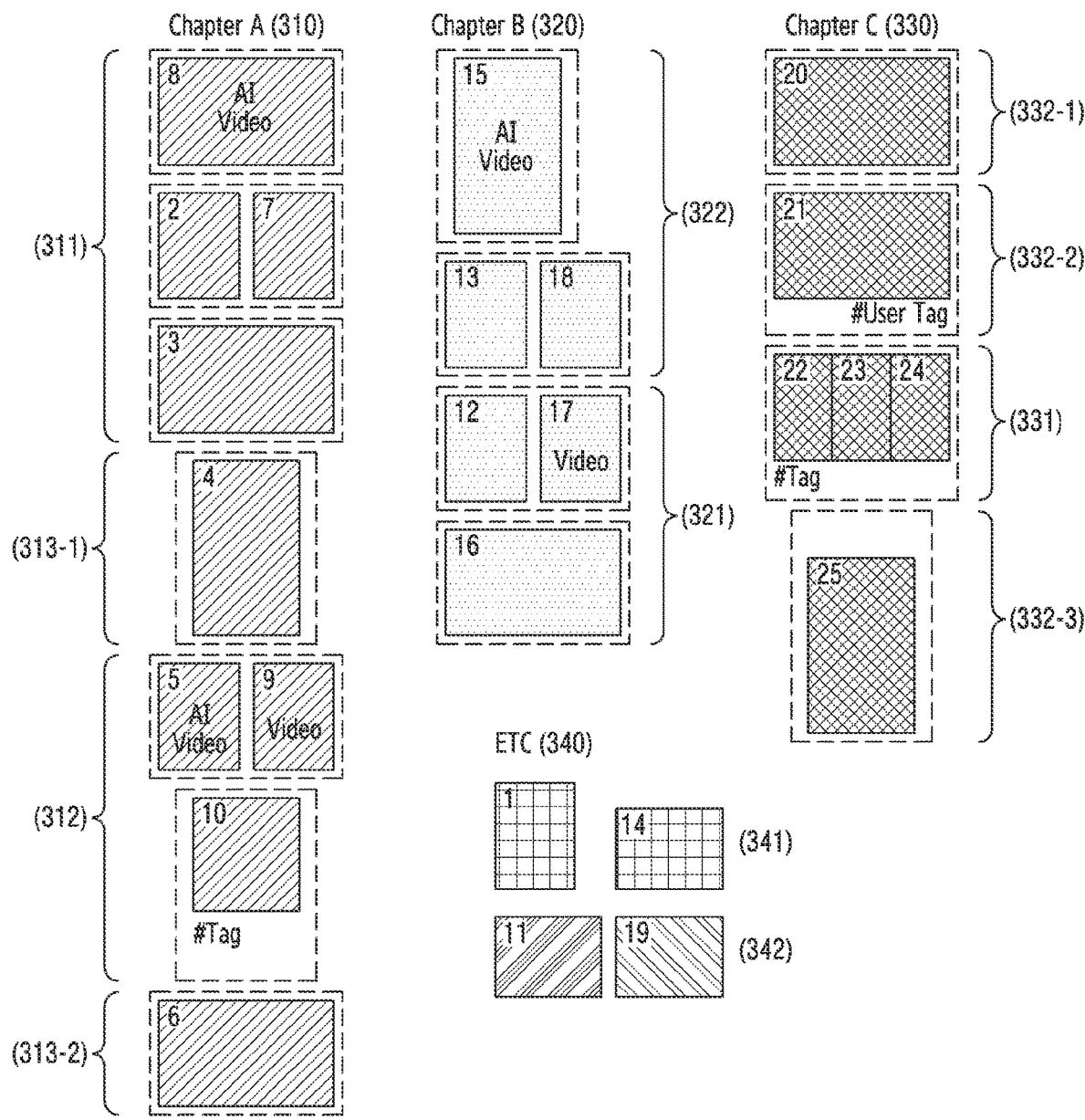

In FIG. 3C, arrangement orders and layouts for the one or more classified chapters and one or more sets may be determined. The electronic device 200 may determine an arrangement order according to a priority of each of the one or more sets in each chapter. The electronic device 200 may determine a priority of each set based on whether the set includes a content of a designated type or based on a content generated time. The content of the designated type may be a content that has a video format and is identified as having a highlight section, and may be indicated as an AI video in FIG. 3C. The electronic device 200 may identify a content in which a change of at least one of an action, a gesture, an emotion, or a sound in the content is detected, through analysis of a section of the content of the video format, as the AI video. According to various embodiments, the electronic device 200 may identify that the AI video is included in the set A-1 311 and the set A-2 312 among the sets included in the chapter A 310, and may identify generated times of the set A-1 311 and the set A-2 312. The generated time may be determined with reference to a content that has the earliest generated (photographed) time among the contents included in each set. The electronic device 200 may determine that the set A-1 311 including the content 2 which has the earliest generated time among the set A-1 311 and the set A-2 312 has a highest priority in the chapter A 310, With respect to the contents of the set A-others 313 that are not classified into the set A-1 311 or the set A-2 312 in the chapter A 310, the electronic device 200 may determine a priority according to a generated time of each content. For example, the content 3 313-1 among the contents of the set A-others 313 may be determined to have a priority between the set A-1 311 and the set A-2 312 according to its generated time, and the content 6 313-2 may be determined to have a lowest priority in the chapter A 310. According to various embodiments, the electronic device 200 may determine an arrangement order of the sets in the chapter A 310 according to the determined priority, and may determine a layout according to the determined arrangement order and a characteristic of each content. The characteristic of the content may include at least one of a type (format), a shape, a ratio of the content, a content identifier, or the number of contents included in a corresponding small group. For example, the electronic device 200 may arrange the content 8, which is the AI video in the set A-1 311 determined to have the highest priority, on an upper end position to expose first in the chapter A 310, and the AI video may be solely arranged in one frame. Since the two contents (contents 2, 7) except for the AI video in the set A-1 311 are all portrait contents, the two contents may be arranged in one frame all together. The electronic device 200 may arrange the content 3 313-1, the set A-2 312, the content 6 313-2 in sequence after the set A-1 311, and, with respect to the set A-2 312, may determine a content combination to include in the same frame according to a characteristic of a content, and may arrange the contents. The content 5 which is the AI video included in the set A-2 312 may not be arranged on the upper end of the chapter A 310, but may be used in generating a highlight content related to the corresponding category. The last content (content 10) of the set including three or more contents like the set A-2 312 may be solely arranged in one frame, and a POI or a tag related to the corresponding content or set may also be displayed within the frame. Regarding the chapter B 320 and the chapter C 330, the electronic device 200 may determine an arrangement order and a layout in the same method as the chapter A 310.

According to an embodiment, the electronic device 200 may identify that an AI video is included in the set B-2 322 among the sets included in the chapter B 320, and may determine that the set B-2 322 has a highest priority in the chapter B 320. According to the determined priority, the set B-2 322, the set B-1 321 may be arranged to be exposed in sequence in the chapter B 320. The electronic device 200 may solely arrange the content 15 which is the AI video in the set B-2 322, determined to have the high priority, on an upper end position exposed first in the chapter B 320. Since the two contents (contents 13, 18) except for the AI video in the set B-2 322 are all portrait contents, the two contents may be arranged in one frame all together. The last content (content 16) of the set B-1 321 including three or more contents may be solely, arranged in one frame, and a POI or a tag related to the corresponding content or set may also be displayed within the frame.

According to various embodiments, the electronic device 200 may identify that there is no set including an AI video among the sets included in the chapter C 330, and may determine priorities of the sets in the chapter C 330 based on generated times. Since the contents of the set C-others 332 do not have similarity, each content may be treated as one set. The electronic device 200 may determine priorities in order of the content 20 332-1, the content 21 332-2, the set C-1 331, the content 25 332-3 according to generated times, and may determine an arrangement order in the chapter C 330 according to the priorities. With respect to the set C-1 331, the electronic device 200 may arrange the contents 22, 23, 24 in one frame all together based on characteristics of the respective contents, and may display a tag related to the set C-1 331 in the frame. The chapter ETC 340 that includes the contents that are not classified into any one of the chapters A, B, or C may be appropriately arranged between the chapters A, B or C according to generated times.

Figure 3D:
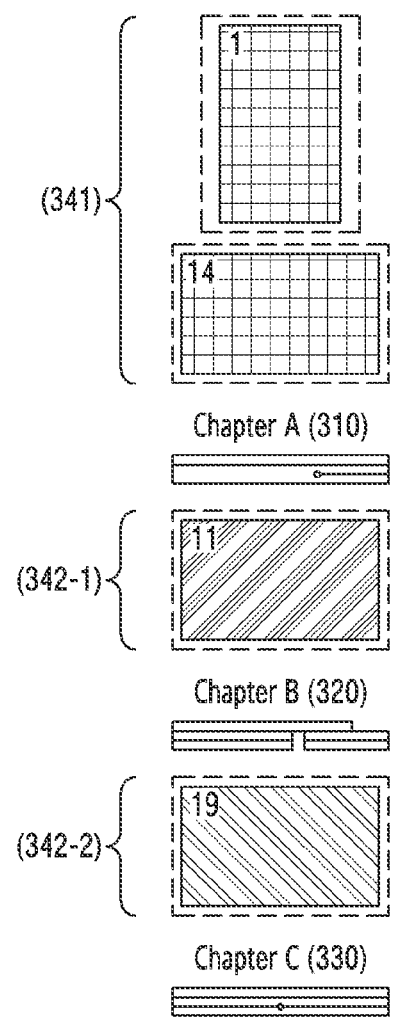

Referring to FIG. 3D, the electronic device 200 may identify that the content 1 which has the earliest generated time among the plurality of contents is included in the set ETC-1 341 of the chapter ETC 340 and may arrange the set ETC-1 341 on an upper end of the chapter A 310. The content 11 included in the set ETC-others 342 may be arranged between the chapter A 310 and the chapter B 320 according to its generated time, and the content 19 may be arranged between the chapter B 320 and the chapter C 330 according to its generated time. According to various embodiments, the electronic device 200 may determine an arrangement order of the set ETC 340 by considering only generated times, Even if a content that is an AI video is included in the set ETC 340, a separate priority may not be given to the corresponding content, and an arrangement order of the content may be determined according to a generated time like the other contents. According to various embodiments, when a user adds a certain content to the feed generated for the plurality of contents, the added content may be treated like the set ETC-others 342.

Figure 4:
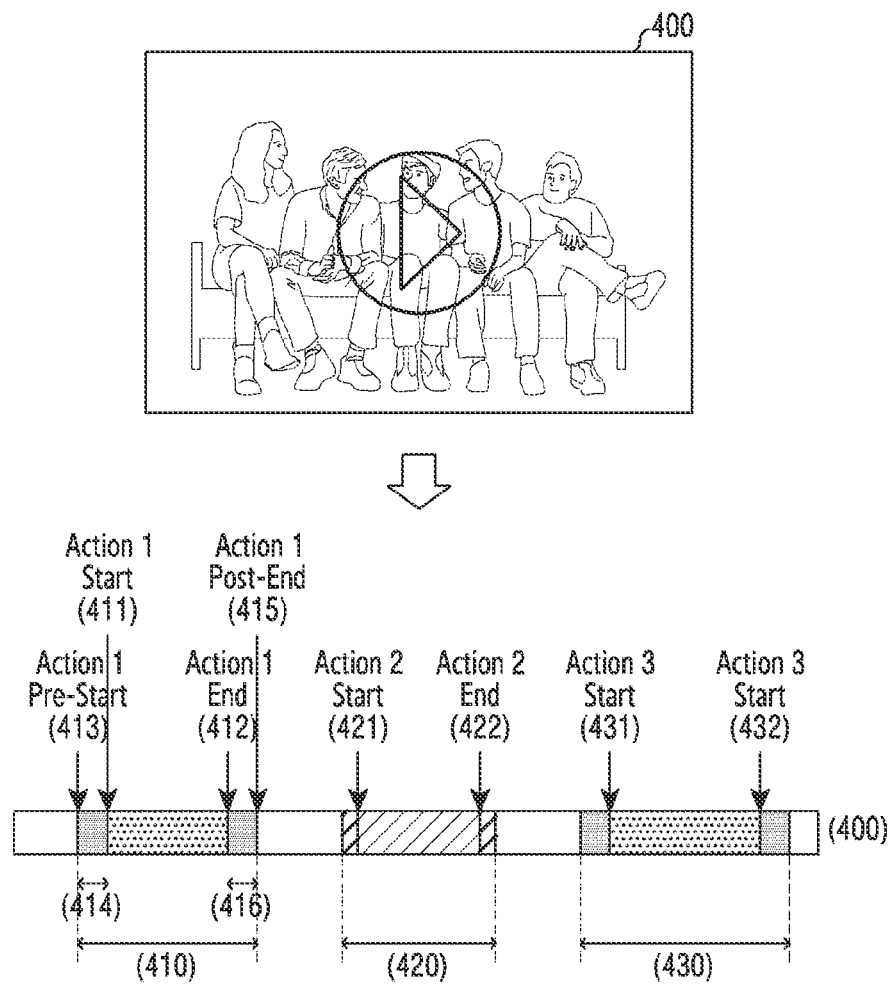
FIG. 4 illustrates a process of generating a highlight content according to an embodiment.

FIG. 4 illustrates a process of generating a highlight content according to an embodiment. According to various embodiments, the electronic device 200 may generate a highlight content by using a content of a video format in which a highlight section is identified.

Referring to FIG. 4, the electronic device 200 may analyze a highlight section regarding a video content 400 of a video format in advance. According to various embodiments, the electronic device 200 may designate a section of the video content 400 in which a change of at least one of an action, a gesture, an emotion, or a sound is detected, as a highlight section. The action may refer to an action made by a person or animal appearing in the video content 400, such as dancing, jumping, running, walking, eating, or playing. The gesture may refer to a gesture that a person appearing in the video content 400 makes by using hands, such as shaking hands, clapping, or waving hands. The emotion may be detected by facial expression, sounds, or a designated behavior of a person or animal appearing in the video content 400, and may be divided into happiness, surprise, or sadness.

In an embodiment, the electronic device 200 may detect sections corresponding to actions 1, 2, 3 in the video content 400 as highlight sections. The electronic device 200 may include, in the highlight section, a preparing action section 414 or a finishing action section 416 for the action, in addition to the section where the action substantially occurs. For example, when it is identified that there is a preparing action related to the action 1 in the video content 400, the electronic device 200 may determine a pre-start point 413 at which the preparing action starts before a start point 411 of the action 1, as a start point of a highlight section 410 related to the action 1 in another example, when it is identified that there is a finishing action related to the action 1 in the video content 400, the electronic device 200 may determine a post-end point 415 at which the finishing action ends after an end point 412 of the action 1, as an end point of the highlight section 410 related to the action 1. The preparing action section 414 and the finishing action section 416 in the video content 400 may be displayed by a tag, or may be automatically, designated with reference to the start point 411 of the action 1 or the end point 412 of the action 1. For example, the electronic device 200 may define a point which is N seconds before the start point 411 of the action 1, as the pre-start point 413, and may define a point which is N seconds after the end point 412 of the action 1, as the post-end point 415. The electronic device 200 may determine highlight sections 420, 430 regarding the action 2 and the action 3 in the same way. The highlight section regarding the action 2 may be determined with a time margin designated with reference to a start point 421 of the action 2 and an end point 422 of the action 2. The highlight section 430 regarding the action 3 may be determined by considering a preparing action section before a start point 431 of the action 3 and a finishing action section after an end point 432 of the action 3.

In an embodiment, at least one editing technique may be applied to the analyzed highlight sections. The electronic device 200 may apply a speed change (for example, a slow motion, a fast motion), zoom-in, or highlighting to the highlight sections.

In an embodiment, the electronic device 200 may generate a highlight content by using highlight sections extracted from one or more video contents. The electronic device 200 may generate the highlight content by combining the at least one extracted highlight section. For example, the electronic device 200 may generate the highlight content by collecting the extracted highlight sections without applying a separate effect in order to provide the highlight content in a preview form. In another example, the electronic device 200 may generate the highlight content by applying a speed change effect to some of the extracted highlight sections in order to provide the highlight content in a preview form. A method for generating the highlight content by applying a different speed change effect to each highlight section may be implemented. According to various embodiments, when there exists only one video content in which a highlight section is analyzed among a plurality of contents in a corresponding category, the electronic device 200 may provide the highlight content by applying an effect such as a speed change only to a section that is detected as the highlight section, without cropping the video content. According to various embodiments, the electronic device 200 may provide a highlight reel, which is a collection of highlight scenes regarding one or more video contents used for generating a highlight content, in a feed separately, from the highlight content.

Figure 5:
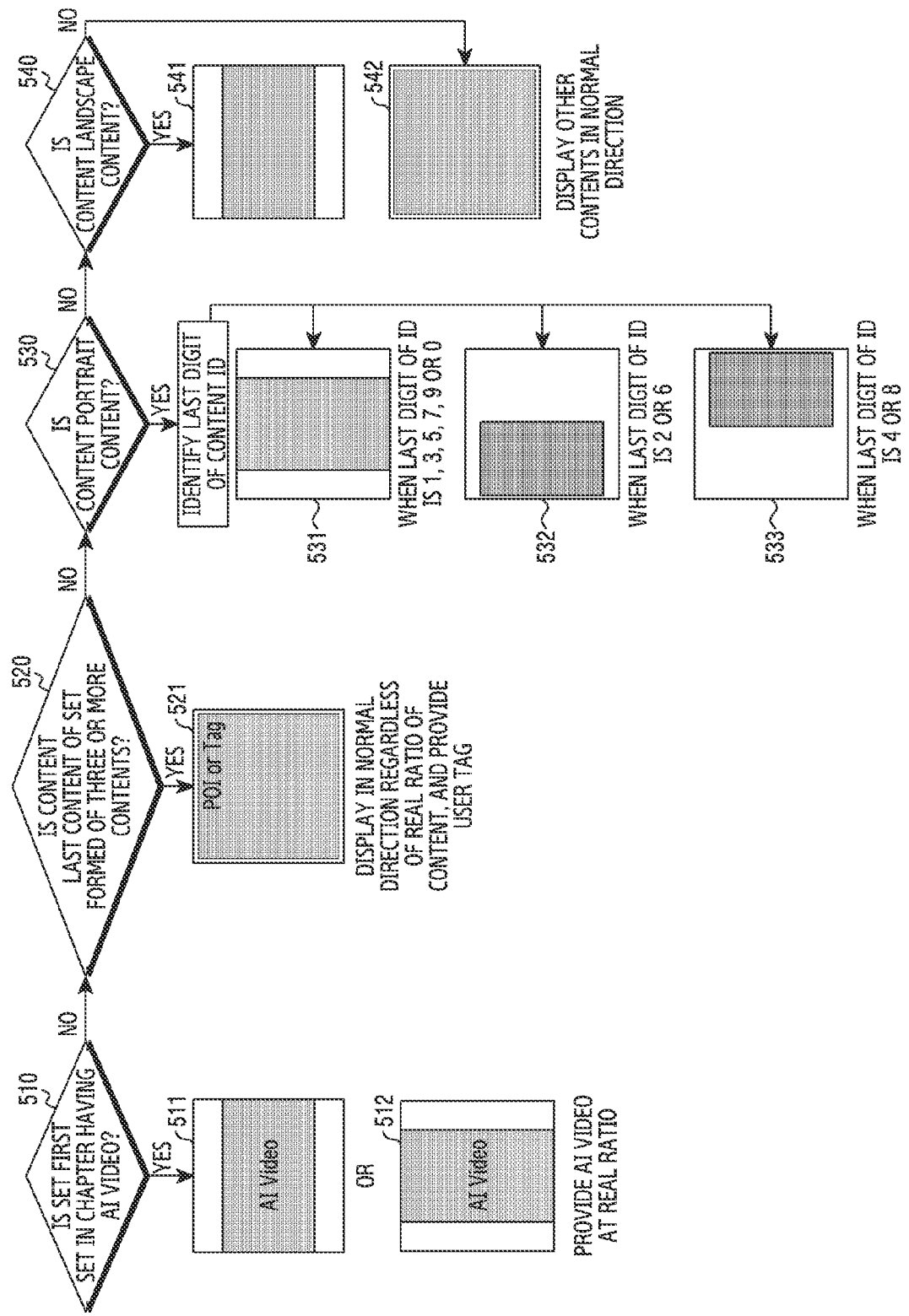
FIG. 5 illustrates a method for arranging one content in a frame according to an embodiment.

FIG. 5 illustrates a method for arranging one content in a frame according to an embodiment. According to various embodiments, the electronic device 200 may classify a plurality of content into one or more sets (or small groups), and then, may determine how to arrange one or more contents included in each set in a frame.

Referring to FIG. 5, in action 510, the electronic device 200 may determine whether a set (or a small group) including one or more contents is a first set having a content corresponding to an AI video. The AI video is a content of a video format in which a highlight section is identified, and may be identified by a tag or a flag. In action 510, the electronic device 200 may determine whether the set is a set that has the earliest generated time among the sets including contents corresponding to the AI video. The generated time may be determined with reference to a content that has the earliest generated (photographed) time among contents included in each set. When it is identified that the set is the set that has the earliest generated time among the sets including the AI video as a result of determining in action 510 (510-Yes), the electronic device 200 may arrange the content corresponding to the AI video in one frame at a real ratio. When the content is a landscape content, the content may be arranged according to a horizontal length of the frame as shown in view 511. When the content is a portrait content, the content may be arranged according to a vertical length of the frame as shown in view 512. The landscape content may indicate a content that has a horizontal length longer than a vertical length, and the portrait content may indicate a content that has a vertical length longer than a horizontal length.

When it is identified that the set is not the first set including the AI video as a result of determining in action 510 (510-No), the electronic device 200 may determine whether each content included in the set is a last content of the set that is formed of three or more contents. When it is identified that the content is the last content of the set including three or more contents as a result of determining in action 520 (520-Yes), the electronic device 200 may display the content in the form of a square having the same horizontal and vertical lengths, regardless of a real ratio, as shown in view 521, and may display a POI or a tag related to the content or the set within the frame. When it is identified that the content is not the last content of the set including three or more contents as a result of determining in action 520 (520-No), the electronic device 200 may determine whether each content included in the set is a portrait content in action 530.

When it is identified that the content is the portrait content as a result of determining in action 530 (530-Yes), the electronic device 200 may identify a last digit of an identifier of the corresponding content. According to various embodiments, the electronic device 200 may determine a different content layout within the frame according to the last digit of the identifier of the content in order to prevent the plurality of contents from being arranged uniformly and monotonously. For example, a portrait content the last digit of the identifier of which is one of 1, 3, 5, 7, 9, or 0 may be arranged to be aligned with the center in the frame, as shown in view 531. A portrait content the last digit of the identifier of which is one of 2 or 6 may be arranged to be aligned with the left side in the frame, as shown in view 532. A portrait content the last digit of the identifier of which is 4 or 8 may be arranged to be aligned with the right side within the frame as shown in view 533.

When it is identified that the content is not the portrait content as a result of determining in action 530 (530-No), the electronic device 200 may determine whether each content included in the set is a landscape content in operation 540. When it is identified that the content is the landscape content as a result of determining in operation 540 (540-Yes), the electronic device 200 may arrange the corresponding content according to a horizontal length of the frame as shown in view 541. When it is identified that the content is not the landscape content as a result of determining in operation 540 (540-No), the electronic device 200 may display the corresponding content in the form of a square in the frame as shown in view 542.

Figure 6:
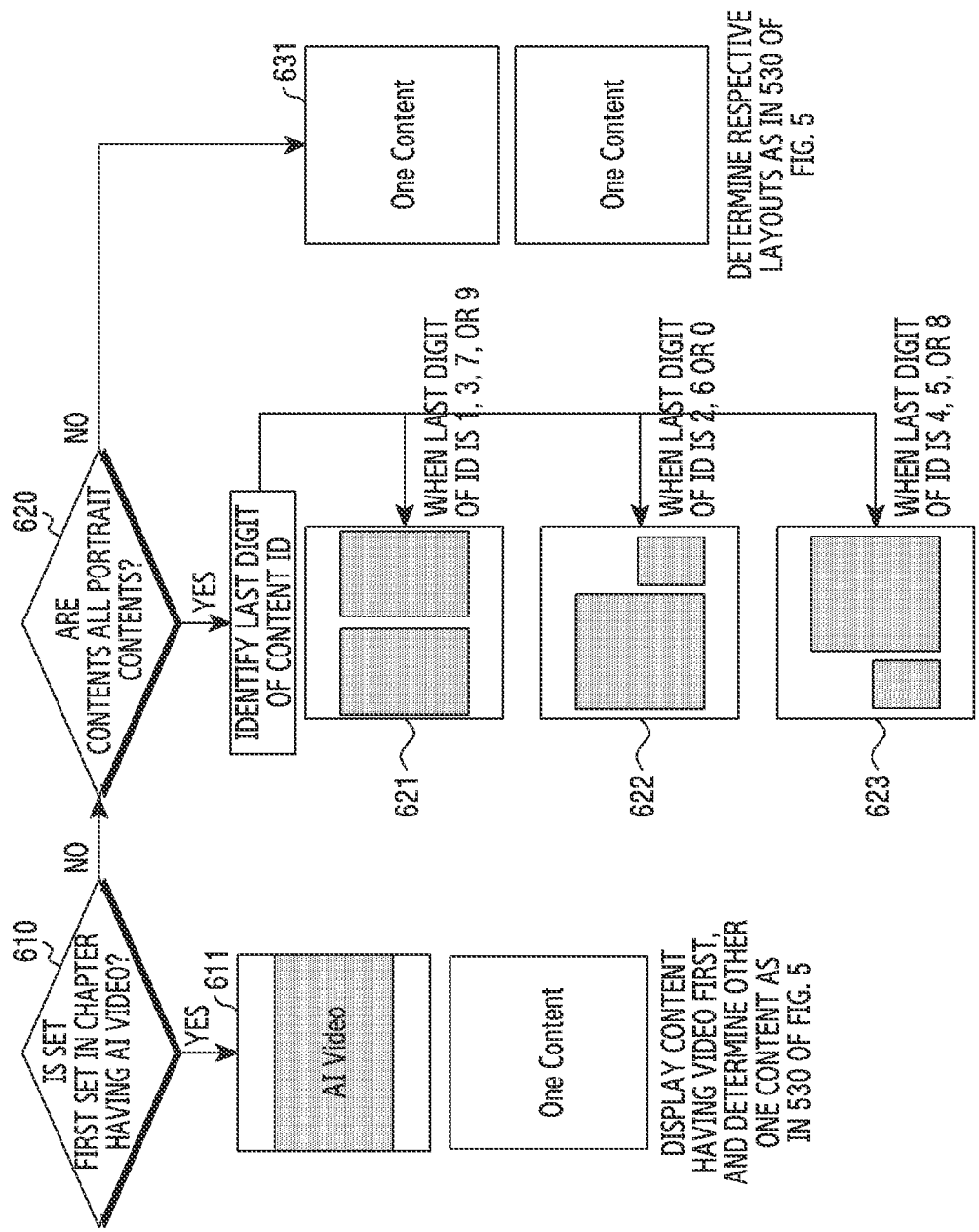
FIG. 6 illustrates a method for arranging two contents in frames according to an embodiment.

FIG. 6 illustrates a method for arranging two contents in frames according to an embodiment. According to various embodiments, as a result of classifying a plurality of contents into one or more sets (or small groups), when two contents are included in the set, the electronic device 200 may determine how to configure a frame.

Referring to FIG. 6, in action 610, the electronic device 200 may determine whether the set is a first set that has a content corresponding to an AI video. The AI video may be a content of a video format in which a highlight section is identified, and may be identified by a tag or flag. In action 610, the electronic device 200 may determine whether the set is a set that has the earliest generated time among the sets including contents corresponding to the AI video. The generated time may be determined with reference to a content that has the earliest generating (photographing time) among contents included in each set. When it is identified that the set is the set that has the earliest generated time among the sets including the AI video as a result of determining in action 610 (610-Yes), the electronic device 200 may arrange two contents included in the set separately in two frames as shown in view 611. The electronic device 200 may arrange a content that corresponds to the AI video out of the two contents within one frame at a real ratio. The electronic device 200 may arrange the other one content that excludes the AI video out of the two contents in one or more separate frames, and in this case, a layout of the content may be determined according to determination in action 530 of FIG. 5.

When it is identified that the set is not the first set including the AI video as a result of determining in action 610 (610-No), the electronic device 200 may determine whether the two contents included in the set are all portrait contents in action 620. When it is identified that the two contents are all portrait contents as a result of determining in action 620 (620-Yes), the electronic device 200 may identify the last digit of the identifier of the first content (a content that has the earliest generated time out of the two contents) of the set. For example, when the last digit of the identifier of the first content of the set is one of 1, 3, 7, or 9, the electronic device 200 may arrange the two contents in parallel in the same size in the frame as shown in view 621. When the last digit of the identifier of the first content of the set is one of 2, 6, or 0, the electronic device 200 may display the first content (the content that has the earliest generated time out of the two contents) out of the two contents in a relatively large size in the frame as shown in view 622. When the last digit of the identifier of the first content of the set is one of 4, 5, or 8, the electronic device 200 may display the second content (a content that has the late generated time out of the two contents) out of the two content in a relatively large size in the frame as shown in view 623.

When the two contents are not all the portrait contents as a result of determining in action 620 (620-Yes), the electronic device 200 may arrange the two contents separately in two frames as shown in view 631, In this case, a layout of each content may be determined by determination in action 530 of FIG. 5.

Figure 7:
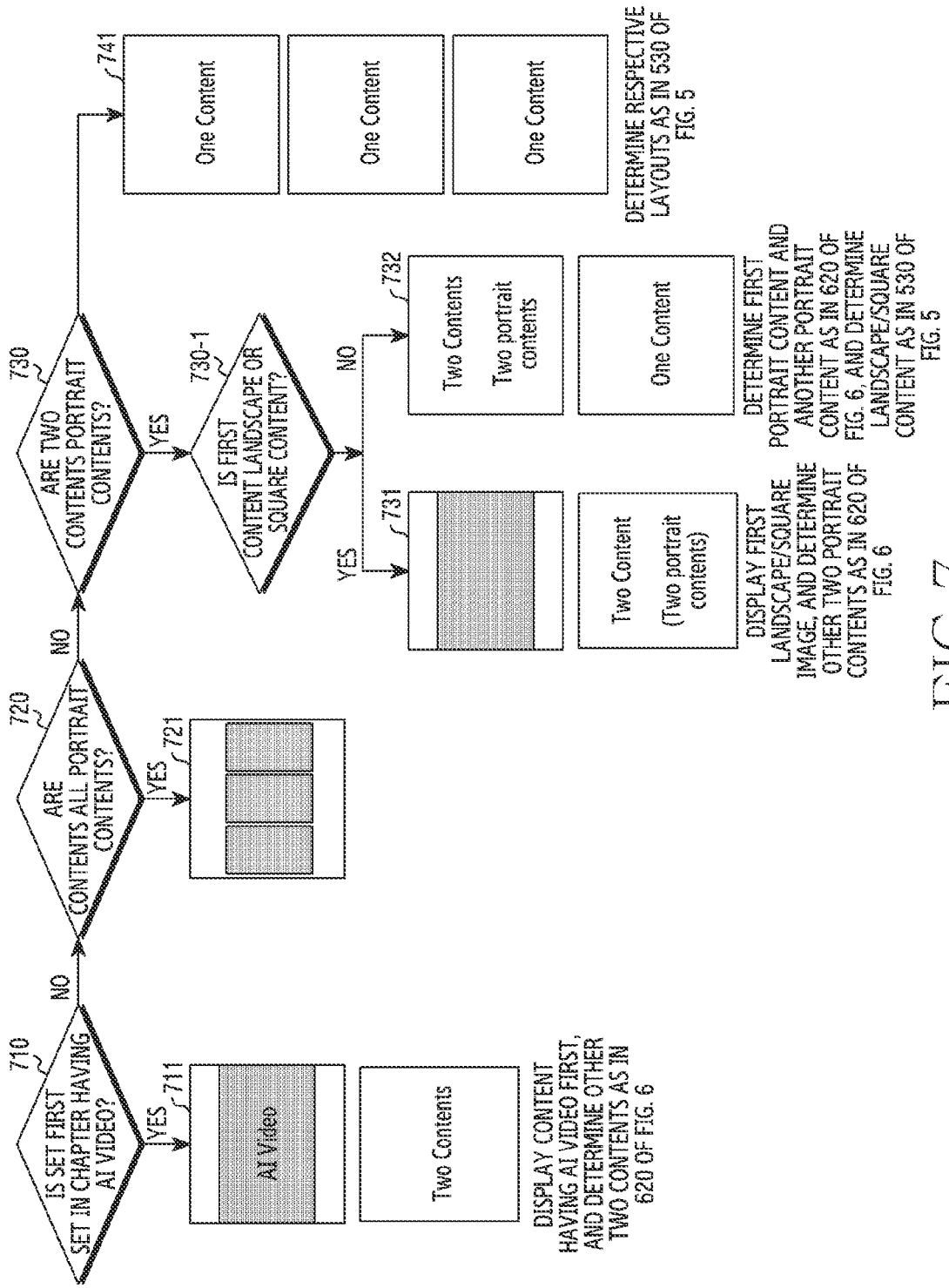
FIG. 7 illustrates a method for arranging three contents in frames according to an embodiment.

FIG. 7 illustrates a method for arranging three contents in frames according to an embodiment. According to various embodiments, as a result of classifying a plurality of contents into one or more sets (or small groups), when three contents are included in the set, the electronic device 200 may determine how to configure a frame.

Referring to FIG. 7, in action 710, the electronic device 200 may determine whether the set is a first set that has a content corresponding to an AI video. In action 710, the electronic device 200 may determine whether the set is a set that has the earliest generated time among the sets including contents corresponding to the video. When it is identified that the set is the set that has the earliest generated time among the sets including the AI video as a result of determining in action 710 (710-Yes), the electronic device 200 may arrange three contents included in the set separately in two or more frames as shown in view 711. The electronic device 200 may arrange a content that corresponds to the AI video out of the three contents within one frame at a real ratio. The electronic device 200 may arrange the other two contents that exclude the AI video out of the three contents in one or more separate frames, and in this case, a layout of the contents may be determined according to determination in action 620 of FIG. 6.

When it is identified that the set is not the first set including the AI video as a result of determining in action 710 (710-No), the electronic device 200 may determine whether the three contents included in the set are all portrait contents in action 720. When it is identified that the three contents are all portrait contents as a result of determining in action 720 (720-Yes), the electronic device 200 may arrange the three contents in parallel in the same size in the frame as shown in view 721.

When it is identified that the three contents are not all the portrait contents as a result of determining in action 720 (720-Yes), the electronic device 200 may determine whether two of the three contents are portrait contents in action 730. When it is identified that two contents of the three contents are the portrait contents as a result of determining in action 730 (730-Yes), the electronic device 200 may additionally determine whether the first content of the set (a content that has the earliest generated time among the three contents) is a landscape content or a square content in action 730-1. When the first content of the set is the landscape content or the square content as a result of determining in action 730-1, the electronic device 200 may solely arrange the landscape or square content in the first frame as shown in view 731, and may arrange the other two portrait contents in parallel in one frame. A layout for the two portrait contents may be determined by determination in action 620 of FIG. 6. When the first content of the set is not the landscape content or the square content as a result of determining in action 730-1, the electronic device 200 may arrange the two portrait contents in the first frame as shown in view 732, and may solely arrange the landscape or square content in the following frame. In this case, a layout for the two portrait contents may be determined by determination in action 620 of FIG. 6, and a layout for one landscape (or square) content may be determined by determination in action 530 of FIG. 5.

When it is identified that two of the three contents are landscape or square contents as a result of determining in action 730 (730-No), the electronic device 200 may arrange the three contents separately in three frames as shown in view 741. In this case, a layout for each content may be determined by determination in action 530 of FIG. 5.

Figure 8A:
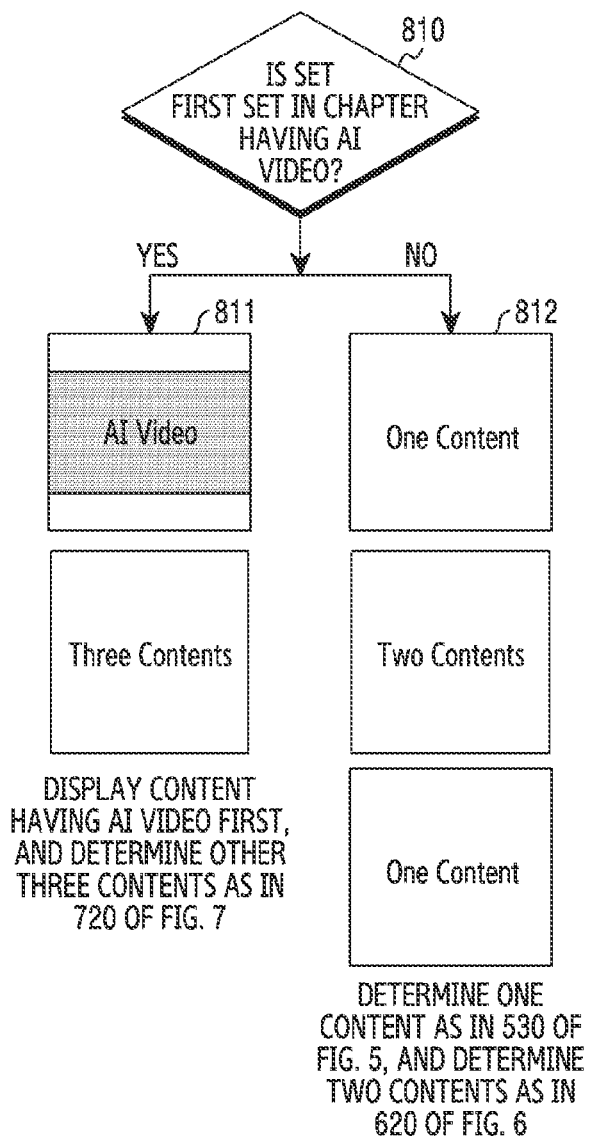
FIGS. 8A, 8B, and 8C illustrate methods for arranging four or more contents in frames according to an embodiment.
Figure 8B:
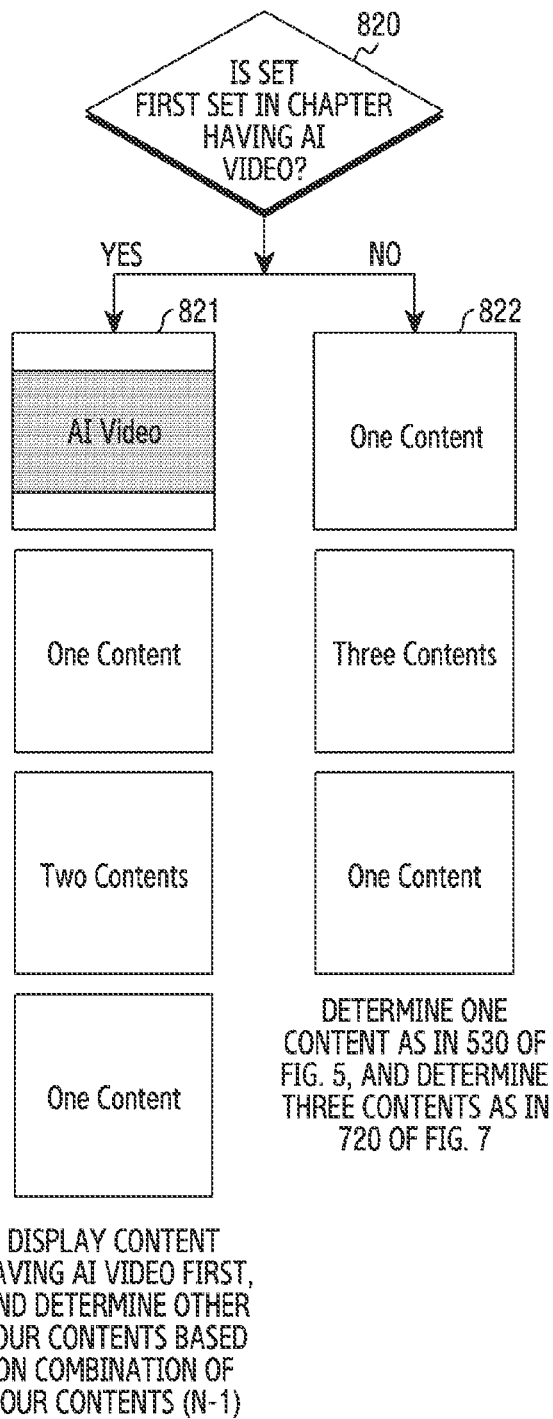
Figure 8C:
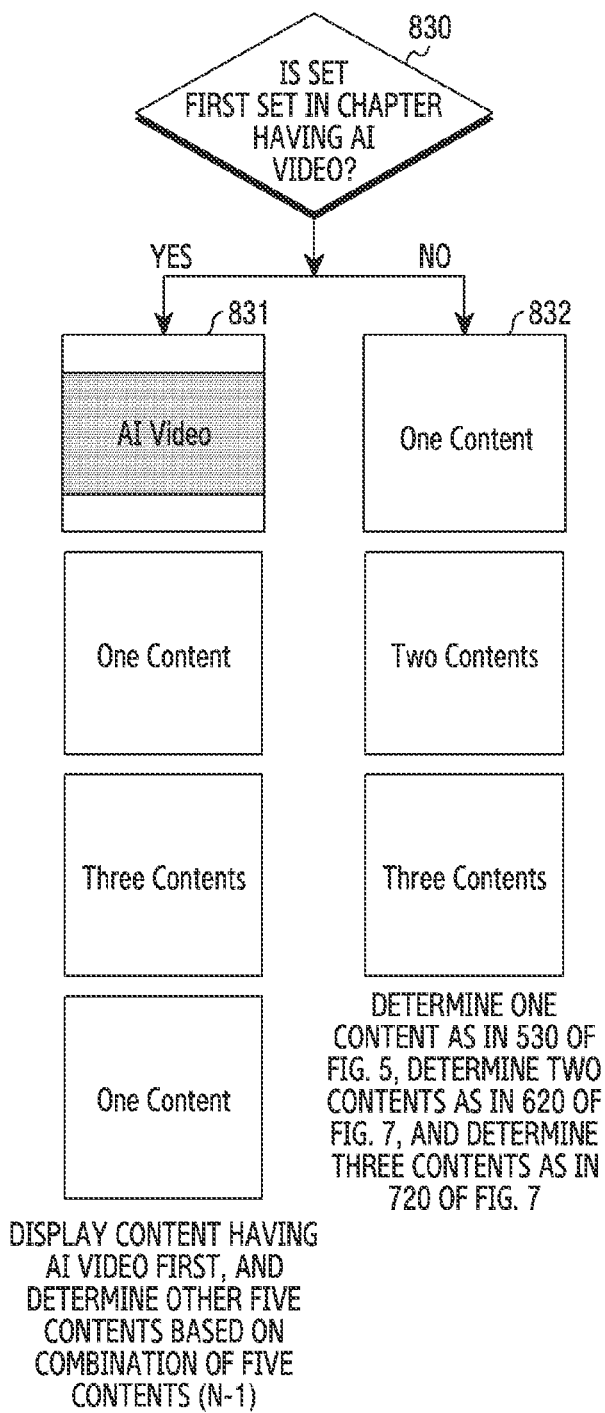

FIGS. 8A, 8B, and 8C illustrate methods for arranging four or more contents in frames according to an embodiment. According to various embodiments, as a result of classifying a plurality of contents into one or more sets (or small groups), when four or more contents are included in the set, the electronic device 200 may determine how to configure a frame.

FIG. 8A illustrates a method of configuring a layout for the set including the four contents. Referring to FIG. 8A, the electronic device 200 may determine whether the set including the four contents is a first set that has a content corresponding to an AI video. In action 810, the electronic device 200 may determine whether the set is a set that has the earliest generated time among the sets including contents corresponding to the AI video. When it is identified that the set is the set that has the earliest generated time among the sets including the AI video as a result of determining in action 810 (810-Yes), the electronic device 200 may arrange the four contents included in the set separately in two or more frames as shown in view 811. The electronic device 200 may arrange a content that corresponds to the AI video among the four contents in the first frame at a real ratio. The electronic device 200 may arrange the other three contents that exclude the AI video among the four contents in one or more separate frames, and in this case, a layout for the contents may be determined by determination in action 720 of FIG. 7.

When it is identified that the set is not the first set including the AI video as a result of determining in action 810 (810-No), the electronic device 200 may arrange the four contents separately in three or more frames as shown in 812, and may solely arrange the last content (a content that has the latest generated time among the four contents) of the set in one frame. In this case, a layout of the frame where one content is arranged may be determined by determination in action 530 of FIG. 5, and a layout of the frame where two contents are arranged may be determined by determination in action 620 of FIG. 6.

FIG. 8B illustrates a method for configuring a layout for a set including five contents. Referring to FIG. 8B, in action 820, the electronic device 200 may determine whether the set is a first set that has a content corresponding to an AI video. When it is identified that the set is the first set that includes the AI video as a result of determining in action 820 (820-Yes), the electronic device 200 may arrange the five contents included in the set separately in four or more frames as shown in view 821. The electronic device 200 may arrange a content that corresponds to the AI video among the five contents in the first frame at a real ratio. The electronic device 200 may arrange the other four contents that exclude the AI video among the five contents in three or more separate frames, and in this case, layouts for the four contents may be determined according to a combination 812 of the four contents described in FIG. 8A.

When it is identified that the set is not the first set including the AI video as a result of determining in action 820 (820-No), the electronic device 200 may arrange the five contents separately in three or more frames as shown in 822. In this case, a layout of a frame where one content is arranged may be determined by determination in action 530 of FIG. 5, and a layout of a combination of the three contents may be determined by determination in action 720 of FIG. 7.

FIG. 8C illustrates a method for configuring a layout for a set including six contents. Referring to 8C, in action 830, the electronic device 200 may determine whether the set is a first set that has a content corresponding to an AI video. When it is identified that the set is the first set that includes the AI video as a result of determining in action 830 (830-Yes), the electronic device 200 may arrange the six contents included in the set separately in four or more frames as shown in view 831. The electronic device 200 may arrange a content that corresponds to the AI video among the six contents in the first frame at a real ratio. The electronic device 200 may arrange the other five contents that exclude the AI video among the six contents in three or more separate frames, and in this case, layouts for the five contents may be determined according to a combination 822 of the five contents described in FIG. 8B.

When it is identified that the set is not the first set including the AI video as a result of determining in action 830 (830-No), the electronic device 200 may arrange the six contents separately in three or more frames as shown in 832. In this case, a layout of a frame where one content is arranged may be determined by determination in action 530 of FIG. 5, a layout of a combination of two contents may be determined by determination in action 620 of FIG. 6, and a layout of a combination f three contents may be determined by determination in action 720 of FIG. 7. According to various embodiments, the electronic device 200 may determine a layout for a set including N number of contents (N is greater than or equal to 5), by referring to a combination of N-1 contents.

Figure 9A:
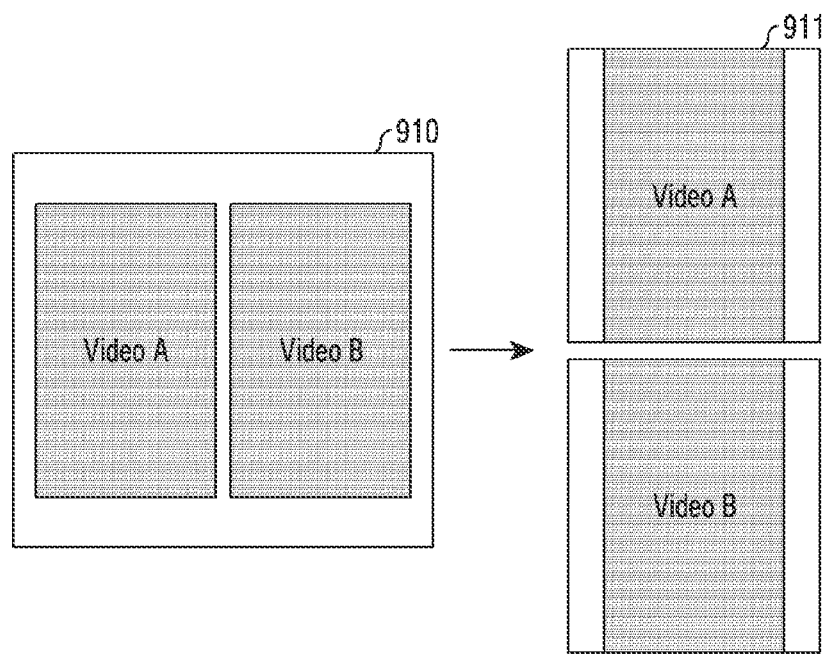
FIGS. 9A, 9B, 9C, 9D, and 9E illustrate methods for arranging two or more video files according to an embodiment.
Figure 9B:
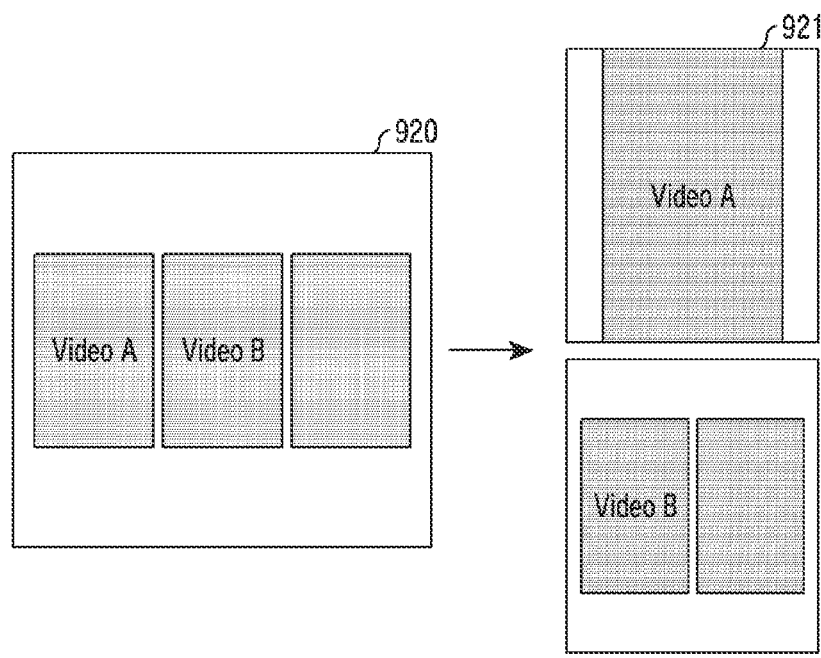
Figure 9C:
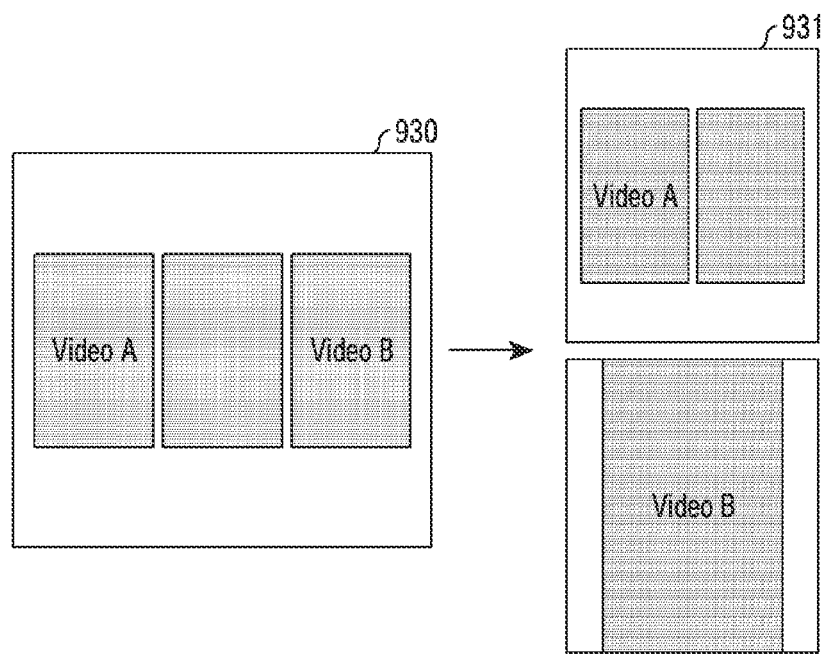
Figure 9D:
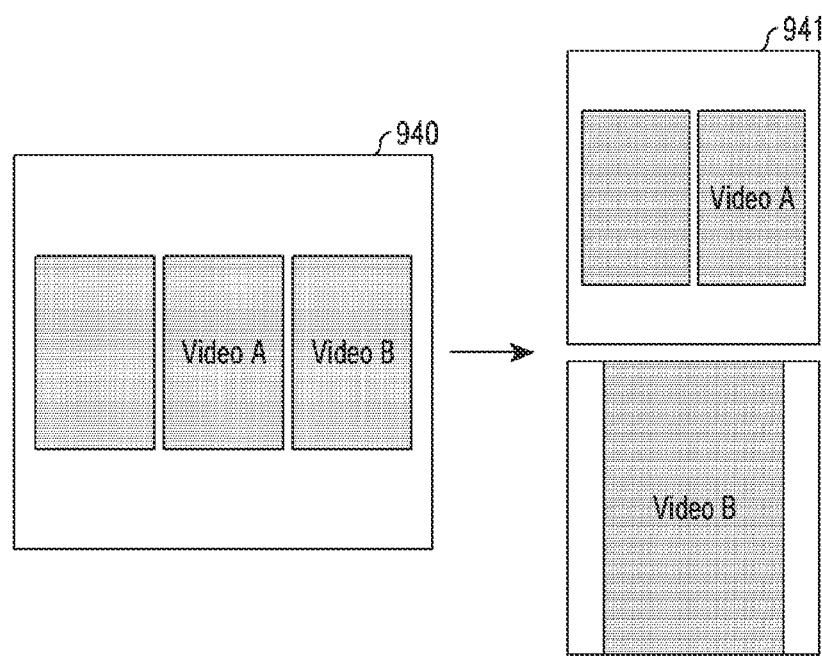
Figure 9E:
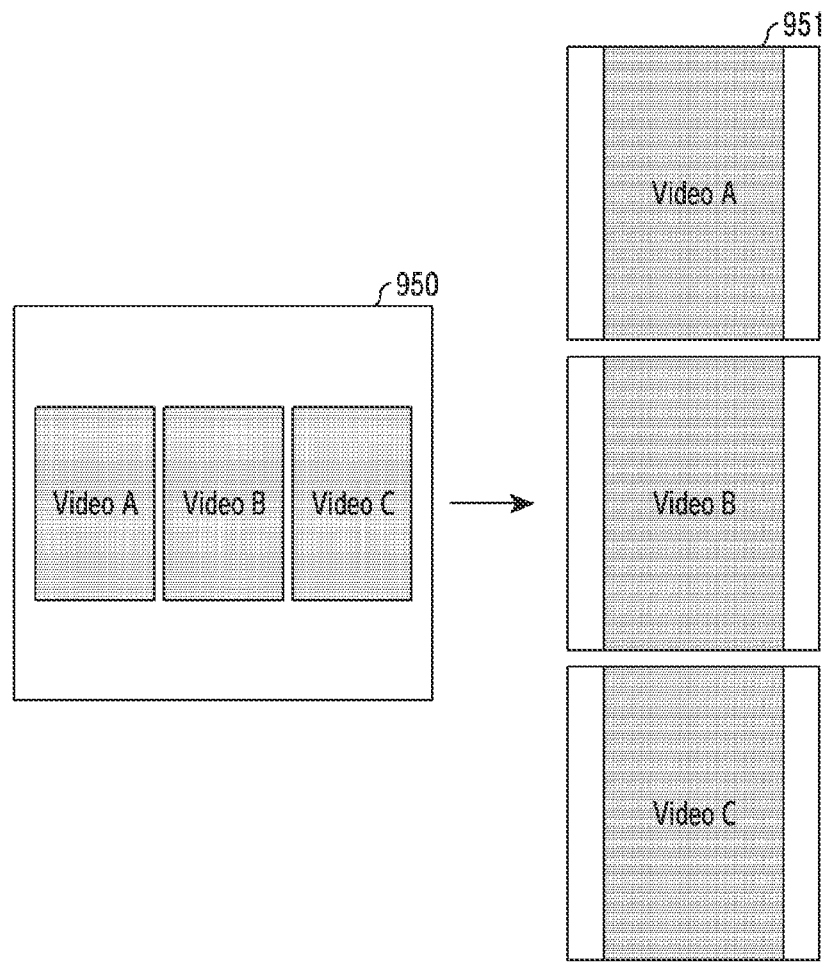

FIGS. 9A, 913, 9C, 9D, and 9E illustrate methods for arranging a plurality of video files according to an embodiment. FIGS. 9A, 913, 9C, and 9D illustrate layouts when two video contents are combined, and FIG. 9E illustrates a layout when three video contents are combined. According to various embodiments, only one video content may be arranged in one frame.

As shown in FIG. 9A, when it is determined that a combination of two contents is arranged in a frame 910, the electronic device 200 may identify whether the two contents are of an image format or a video format. When it is identified that there is no content of the video format out of the two contents or one content is of the video format, the electronic device 200 may determine a layout in the method described in FIG. 6. When it is identified that the two contents are all of the video format, the electronic device 200 may arrange the two contents separately in two frames as shown in view 911.

When it is determined that a combination of three contents is arranged in a frame 920, 930, 930, 950 as shown in FIG. 913, 9C, 9D, or 9E, the electronic device 200 may identify how many contents are of the video format among the three contents. When it is identified that there is no content of the video format among the three contents or one content is of the video format, the electronic device 200 may determine a layout in the method described in FIG. 7. When it is identified that the two contents are of the video format among the three contents, the electronic device 200 may arrange the three contents separately in two frames. According to an embodiment, in FIG. 9B, 9C, or 9D, a layout for a combination of three contents may be determined according to an order in which the video contents are included. Referring to FIG. 9B, one video format content of the three contents may be solely arranged in the first frame as shown in view 921, and another video format content may be arranged in the second frame along with the other content. Referring to FIGS. 9C and 9D, one video format content of the three contents may be arranged in the first frame along with a content of a different format (for example, an image file), and the other video format content may be solely arranged in the second frame. When a content of a video format is arranged in one frame along with a content of a different format, the content of the video format may be arranged on the left side of the frame as shown in view 931, or may be arranged on the right side of the frame as shown in view 941. When it is identified that the three contents are all contents of the video format as shown in FIG. 9E, the electronic device 200 may arrange the three video contents separately in three different frames as shown in view 951.

Figure 10A:
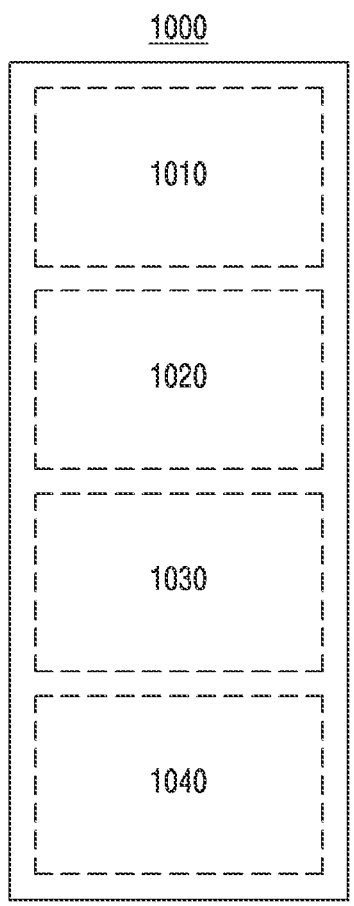
FIGS. 10A and 10B illustrate methods for generating and providing a feed related to a plurality of multimedia contents according to an embodiment.
Figure 10B:
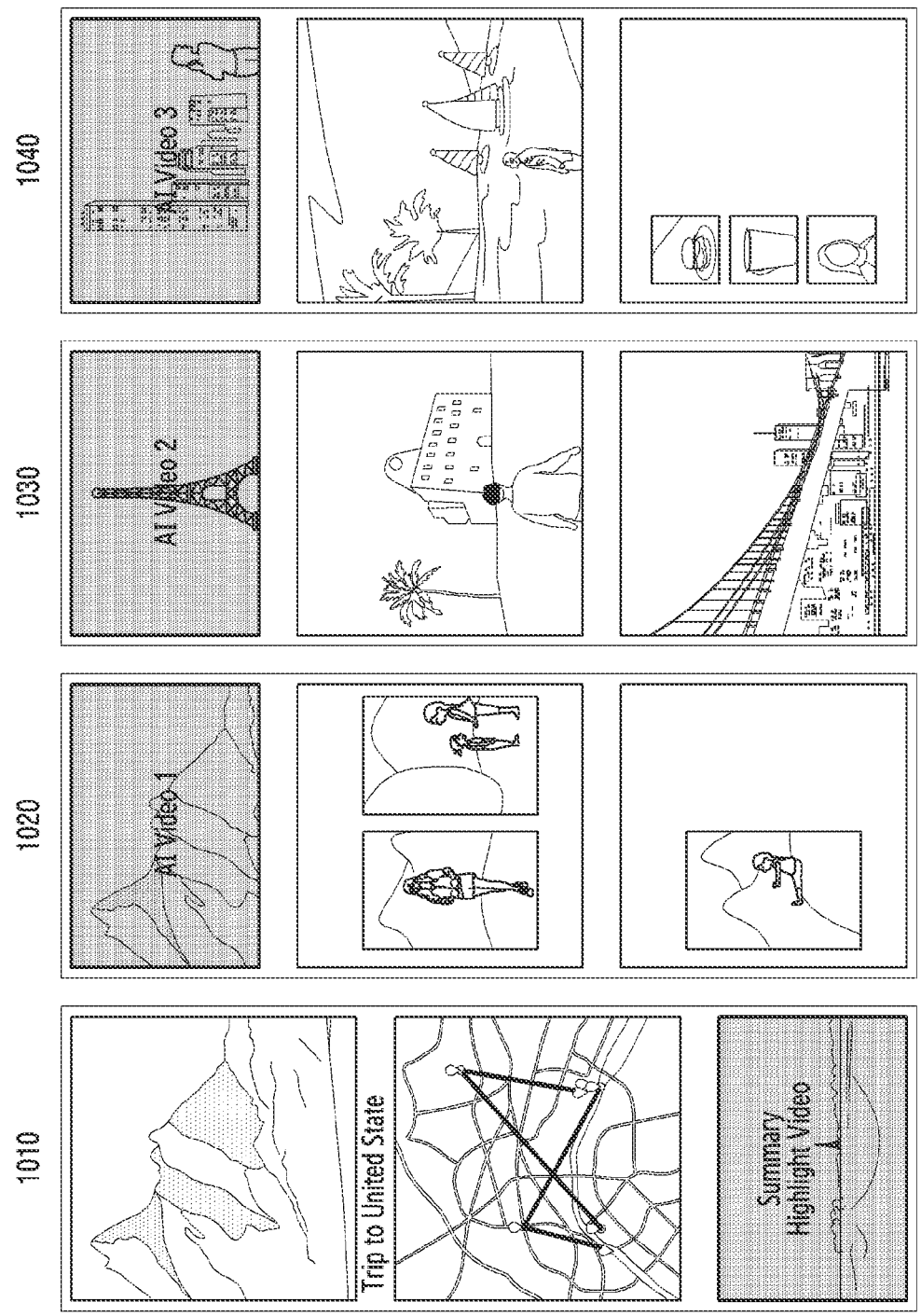

FIGS. 10A and 10B illustrate methods for generating and providing a feed regarding a plurality of multimedia contents according to an embodiment. According to various embodiments, the electronic device 200 may arrange a highlight content showing a summary of a corresponding feed on an upper end of the feed 1000 related to a specific category, and may arrange a plurality of contents acquired in relation to the specific category, such that the contents are exposed subsequent to the highlight content. The electronic device 200 may arrange layouts for the plurality of contents; which are determined according to the above-described method, on positions subsequent to the highlight in sequence.

Referring to FIG. 10A, the highlight content may be arranged on an uppermost end position 1010 in the feed

1000. The highlight content may be generated by using one or more video format contents in which a highlight section is analyzed among the plurality of contents. The plurality of contents may be classified into one or more groups based on context information, and may be arranged on positions 1020, 1030, 1040 subsequent to the highlight content Detailed configurations of the contents included in the respective positions in the feed 1000 may be illustrated in FIG. 10B.

In FIG. 10B, on the uppermost end position 1010 of the feed 1000 the title, representative image of the corresponding feed 1000 and the highlight content may be arranged. According to various embodiments, the electronic device 200 may classify the plurality of contents into groups 1, 2, 3 based on context information, and may determine priorities of the classified groups 1, 2, 3 based on generated times. For example, the groups 1, 2, 3 may be arranged on the second upper end position 1020, the third upper end position 1030, and the lower end position 1040 in sequence in the feed.

According to various embodiments, the electronic device 200 may classify one or more contents that are identified as having similarity based on a POI or a tag in the group 1 1020 into a small group. A content that does not belong to the large group or small group may be treated as one group in itself. The electronic device 200 may determine a priority of one or more small groups based on whether a specific content is included and a generated time. The specific content may be a content of a video format in which a highlight section is analyzed, and the generated time may be determined with reference to a content that has the earliest photographing time among contents included in each small group. For example, a small group that includes the specific content and has the earliest generated time among the one or more small groups may have a highest priority, and may be arranged on the upper end position in the group 1 1020. In the small group, the specific content may be arranged on the top position and the other contents may be arranged below the top position in sequence. Priorities of the other small groups except for the small group given the highest priority among the one or more small groups may be determined based on generated times, and the other small groups may be arranged below the upper end position in sequence according to the determined priorities. According to various embodiments, the electronic device 200 may arrange the plurality of contents in the feed according to layouts which are determined for the one or more small groups. A layout for each content may be determined by the content arrangement method described in FIGS. 5 to 9E, FIG. 11 illustrates a flowchart illustrating an operating method of an electronic device according to an embodiment. According to an embodiment, the electronic device 200 is a device that outputs a multimedia content that the device acquires by directly photographing or receives from an external electronic device (for example, the external electronic device 102, 104 of FIG. 1) in various methods, and may correspond to the electronic device 101 shown in FIG. 1. Actions of FIG. 11 may be performed by at least one processor (for example, the processor 120 of FIG. 1 or at least one processor 220 of FIG. 2) included in the electronic device 200.

Figure 11:
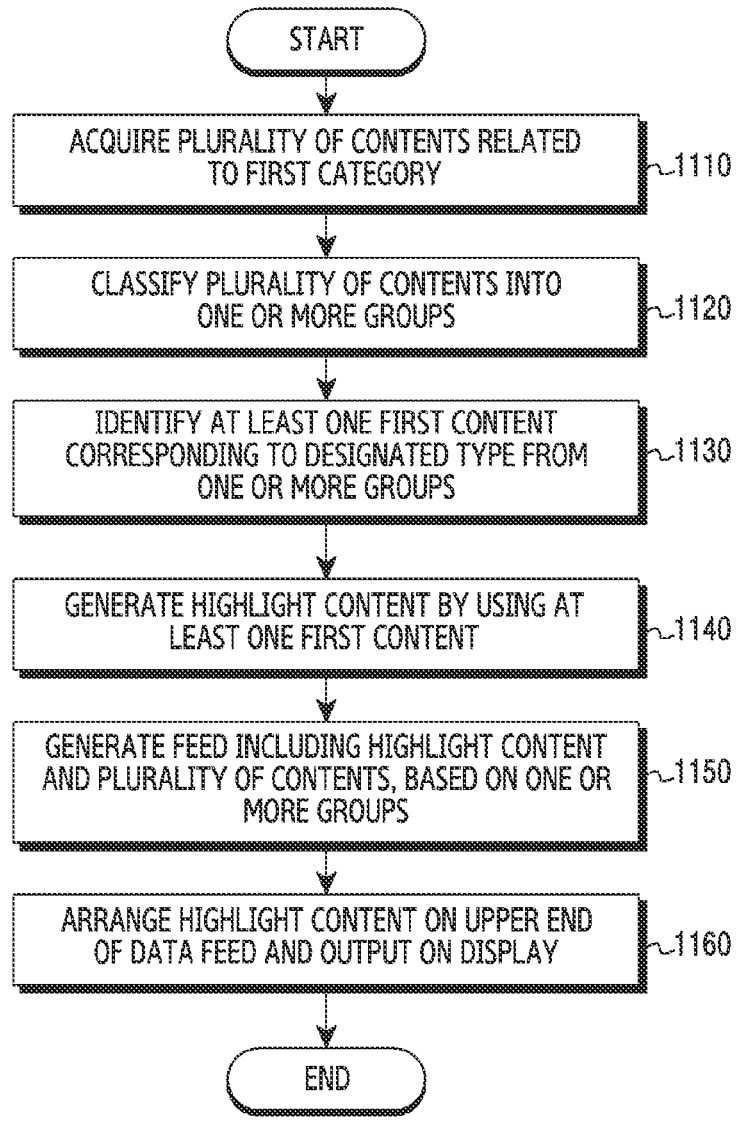
FIG. 11 illustrates a flowchart illustrating an operating method of an electronic device according to an embodiment.

Referring to FIG. 11, in action 1110, the electronic device 200 may acquire a plurality of contents related to a first category. The first category may indicate a common subject of contents for configurating a teed, and may be identified by person, pet, travel, landscape, food, daily life, special day, growth diary, or a combination thereof, and may not be limited to one subject. According to various embodiments, when a designated condition is satisfied, the electronic device 200 may acquire a plurality of contents 300 from a memory (for example, the memory 130 of FIG. 1 or the memory 230 of FIG. 2). The designated condition may refer to a condition where a content related to a specific category is photographed or stored in excess of a designated number for a designated period. For example, when it is identified that contents regarding a baby recognized as the same person are created with 10 or more photos taken for one year, the electronic device 200 may extract the identified contents from the memory.

In an embodiment, in action 1120, the electronic device 200 may classify the plurality of contents into one or more groups, based on context information of the acquired plurality of contents. The context information may include at least one of a time, a place, a point of interest (POI), or a user tag related to each of the plurality of contents.

According to various embodiments, the electronic device 200 may classify the plurality of contents into one or more large groups based on a first context of the context information. The electronic device 200 may classify one or more contents included in each of the one or more large groups into one or more small groups, based on a second context which is different from the first context. For example, the electronic device 200 may classify a plurality of contents related to 'baby' into one or more large groups according to photographing dates, and may classify the one or more large groups into one or more small groups according to photographing places or actions. In another example, the electronic device 200 may classify a plurality of contents related to 'overseas travel' into one or more large groups according to cities, and may classify the one or more large groups into one or more small groups according to photographing dates. In the process of classifying, a content of the plurality of contents that does not have a common context to the other contents may not be classified into any one group. A content that does not belong to the large group or the small group may be treated as one group in itself.

According to an embodiment, in action 1130, the electronic device 200 may identify at least one first content corresponding to a designated type from the one or more classified groups. The first content may be a content in which a highlight section is identified among contents of video format. The highlight section may indicate a section in which a change of a least one of an action, a gesture, an emotion, or a sound in the content is detected. According to various embodiments, the electronic device 200 may analyze a highlight section with respect to a content of a video format in advance, and may display the content in which the highlight section is identified through the analysis by using a tag or a flag.

According to an embodiment, in action 1140, the electronic device 200 may generate a highlight content by using the at least one first content. According to various embodiments, the electronic device 200 may extract the highlight section from the at least one first content, and may generate the highlight content by combining the at least one extracted highlight section. The electronic device 200 may apply zoom-in, a speed change (for example, a slow motion, a fast motion), or highlighting to each highlight section when generating the highlight content.

According to an embodiment, in action 1150, the electronic device 200 may generate a feed including the highlight content and the plurality of contents, based on the one or more groups. The electronic device 200 may generate a layout for each of the one or more classified groups, and may generate the feed by appropriately arranging the plurality of contents in the generated layouts. According to various embodiments, in action 1150, the electronic device 200 may determine a priority of each of the one or more classified groups, and may determine an arrangement order of the plurality of contents according to the determined priority. For example, the electronic device 200 may determine a priority of each of the one or more small groups, based on whether the at least one first content is included or a content generated time. The electronic device 200 may determine a highest priority for a first small group that has the earliest content generated time among the small groups including the at least one first content. The electronic device 200 may determine priorities of the other small groups except for the first small group among the one or more small groups, based on content generated times. On the assumption that a large group X includes small groups A, B, C, the electronic device 200 may identify that the small group A and the small group B include the first content, and may identify generated times of the small groups A, B, A generated time of each group may be determined with reference to a content that has the earliest generated (photographed) time among contents included in the group. The electronic device 200 may identify that the generated time of the small group A is earlier than the generated time of the small group B, and may determine that the small group A has a highest priority in the large group X. The electronic device 200 may determine priorities of the other small groups B, C except for the small group A, according to generated times. When it is identified that a generated time of the small group C is earlier than a generated time of the small group B, the electronic device 200 may determine a higher priority of the small group C than that of the small group B. The priority of the one or more large groups may be determined based on generated times. According to various embodiments, the electronic device 200 may determine an arrangement order of the one or more small groups in the large group according to the determined priority. For example, the arrangement order of the small groups may be determined in the large group X in order of the small group A, the small group C, and the small group 13 according to the determined priority. In addition, the electronic device 200 may arrange the first content included in the small group A having the highest priority in the large group X on an uppermost end, and may determine an arrangement order of the other contents according to generated times.

According to an embodiment, in action 1160, the electronic device 200 may arrange the highlight content on an upper end of the feed, and may arrange the plurality of contents on positions exposed subsequent to the highlight content, and may display the feed on a display (for example, the display module 160 of FIG. 1 or the display 210 of FIG. 2). According to various embodiments, in action 1160, the electronic device 200 may determine a layout for one or more contents included in each of the one or more groups, based on the determined arrangement order and a content characteristic. The content characteristic may include at least one of a type (format), a shape, a ratio of the content, a content identifier, or the number of contents included in the corresponding small group. The electronic device 200 may determine how to arrange the contents in a frame by considering a characteristic of each content, while arranging the plurality of contents according to the determined arrangement order. For example, on the assumption that three contents are included in the small group A, the electronic device 200 may determine a layout based on respective shapes of the three contents. When one content of the three contents has a square shape and the two contents have a landscape shape, the electronic device 200 may determine to arrange the three contents in different frames. When all of the three contents have portrait shapes, the electronic device 200 may determine to arrange the three contents in one frame. According to various embodiments, the electronic device 200 may determine to arrange contents on different positions in a frame according to the last digit of the identifier of each content in order to prevent the plurality of contents from being arranged uniformly and monotonously. For example, when the last digit of the identifier of a content is '1', the content may be arranged to be aligned with the center in the frame. When the last digit of the identifier of a content is '2', the content may be arranged to be aligned with the left side in the frame. According to various embodiments, the electronic device 200 may display a user tag or a POI related to each content along with the content in the frame. The user tag or the POI may be displayed overlapping one corner of the content or may be displayed in a margin in the frame.

According to an embodiment, an electronic device may include: a display; at least one processor operatively connected with the display; and a memory configured to store a plurality of contents and operatively connected with the at least one processor, and the memory may store instructions that, when being executed, cause the at least one processor to: acquire the plurality of contents related to a first category from the memory; classify the plurality of contents into one or more groups, based on context information of the plurality of contents; identify at least one first content corresponding to a designated type from the one or more groups; generate a highlight content by using the at least one first content; generate a feed including the highlighted content and the plurality of contents, based on the one or more groups; and arrange the highlight content on an upper end of the feed to output on the display.

In an embodiment, the instructions may cause the at least one processor to: classify the plurality of contents into the one or more groups, based on a first context of the context information; and classify one or more contents included in each of the one or more groups into one or more sub-groups, based on a second context different from the first context of the context information.

In an embodiment, the context information may include at least one of a time, a place, a point of interest (POI), or a user tag related to each of the plurality of contents.

In an embodiment, the at least one first content may be of a video format in which a highlight section is identified, and the highlight section may be a section of the at least one first content in which a change of at least one of an action, a gesture, an emotion, or a sound is detected.

In an embodiment, the instructions may cause the at least one processor to: extract the highlight section from the at least one first content; and generate the highlight content by combining and editing the highlight section.

In an embodiment, the instructions may cause the at least one processor to: determine a priority of the one or more sub-groups, based on whether the at least one first content is included or a generated time; and determine an arrangement order of the one or more sub-groups in one of the one or more groups according to the determined priority.

In an embodiment, the instructions may cause the at least one processor to identify a first sub-group from the sub-groups, the first sub-group including an earliest generated time among the sub-groups and comprising the at least one first content, and assign a highest priority to the first sub-group.

In an embodiment, the instructions may cause the at least one processor to determine priorities of other sub-groups except for the first sub-group among the one or more sub-groups, based on the generated time.

In an embodiment, the instructions may cause the at least one processor to determine a layout for the one or more contents included in the one or more sub-groups, based on the determined arrangement order and a content characteristic, and the content characteristic may include at least one of a type, a shape, a ratio of a content, a content identifier, or a number of contents included in the sub-groups.

In an embodiment, the instructions may cause the at least one processor to arrange the plurality of contents on positions subsequent to the highlight content in the feed, based on the determined arrangement order and the determined layout.

In an embodiment, an operating method of an electronic device may comprise: acquiring a plurality of contents related to a first category; classifying the plurality of contents into one or more groups, based on context information of the plurality of contents; identifying at least one first content corresponding to a designated type from the one or more groups; generating a highlight content by using the at least one first content; generating a feed including the highlighted content and the plurality of contents, based on the one or more groups; and arranging the highlight content on an upper end of the feed for outputting on a display.

In an embodiment, classifying the plurality of contents into the one or more groups may comprise: classifying the plurality of contents into the one or more groups, based on a first context of the context information; and classifying one or more contents included in each of the one or more groups into one or more sub-groups, based on a second context different from the first context of the context information.

In an embodiment, the context information may include at least one of a time, a place, a point of interest (POI), or a user tag related to each of the plurality of contents.

In an embodiment, the at least one first content may be of a video format in which a highlight section is identified, and the highlight section may be a section of the at least one first content in which a change of at least one of an action, a gesture, an emotion, or a sound is detected.

In an embodiment, generating the highlight content may comprise: extracting the highlight section from the at least one first content; and generating the highlight content by combining and editing the highlighted section.

In an embodiment, generating the teed including the highlight content and the plurality of contents may comprise: determining a priority of the one or more sub-groups, based on whether the at least one first content is included or a generated time; and determining an arrangement order of the one or more sub-groups in one of the one or more groups according to the determined priority.

In an embodiment, determining the priority of the one or more sub-groups may comprise identifying a first sub-group from the sub-groups, the first sub-group including an earliest generated time among the sub-groups and comprising the at least one first content, and assigning a highest priority to the first sub-group.

In an embodiment, determining the priority of the one or more sub-groups may comprise determining priorities of the other sub-groups except for the first sub-group among the one or more sub-groups, based on the generated time.

In an embodiment, arranging the highlight content on the upper end of the feed for outputting on the display may comprise determining a layout for the one or more contents included in the one or more sub-groups, based on the determined arrangement order and a content characteristic, and the content characteristic may include at least one of a type, a shape, a ratio of a content, a content identifier, or a number of contents included in the sub-groups.

In an embodiment, arranging the highlight content on the upper end of the feed for outputting on the display may comprise arranging the plurality of contents on positions subsequent to the highlight content in the feed, based on the determined arrangement order and the determined layout.

The electronic device according to various embodiments may be one of various types of electronic devices. The electronic devices may include, for example, a portable communication device smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a display;
at least one processor; and
a memory configured to store a plurality of contents,
wherein the memory stores instructions that, when executed by the at least one processor, cause the electronic device to:
acquire the plurality of contents related to a first category from the memory;
classify the plurality of contents into one or more groups, based on context information of the plurality of contents;
identify, from the one or more classified groups, at least one first content corresponding to a designated type of content, the designated type being a video format in which a highlight section is identified;
generate a highlight content by extracting a section from the at least one first content;
generate a feed comprising the highlighted content and the plurality of contents, based on the one or more classified groups;
determine a priority of each of the one or more classified groups based on content generated times, a highest priority determined for a group including an earliest content generated time; and
arrange the highlight content on an upper end of the feed to output on the display, based on the priority determined for the one or more classified groups, such that:
the plurality of contents are exposed subsequent to the highlight content;
the group having the highest priority is on an upper end position of the feed; and
a group having a lower priority is on a lower end position of the feed.

2. The electronic device of claim 1, wherein the instructions, when executed by the at least one processor, further cause the electronic device to:
classify the plurality of contents into the one or more groups, based on a first context of the context information; and
classify one or more contents included in each of the one or more groups into one or more sub-groups, based on a second context different from the first context of the context information.

3. The electronic device of claim 2, wherein the instructions, when executed by the at least one processor, further cause the electronic device to:
determine a priority of the one or more sub-groups, based on whether the at least one first content is included or a generated time; and
determine an arrangement order of the one or more sub-groups in one of the one or more groups according to the determined priority.

4. The electronic device of claim 3, wherein the instructions, when executed by the at least one processor, further cause the electronic device to:
identify a first sub-group from the sub-groups, the first sub-group including an earliest generated time among the sub-groups and comprising the at least one first content; and
assign a highest priority to the first sub-group.

5. The electronic device of claim 4, wherein the instructions, when executed by the at least one processor, further cause the electronic device to determine priorities of other sub-groups except for the first sub-group among the one or more sub-groups, based on the generated time.

6. The electronic device of claim 3, wherein the instructions, when executed by the at least one processor, further cause the electronic device to determine a layout for the one or more contents included in the one or more sub-groups, based on the determined arrangement order and a content characteristic, and
wherein the content characteristic comprises at least one of a type, a shape, a ratio of a content, a content identifier, or a number of contents included in the sub-groups.

7. The electronic device of claim 6, wherein the instructions, when executed by the at least one processor, further cause the electronic device to arrange the plurality of contents on positions subsequent to the highlight content in the feed, based on the determined arrangement order and the determined layout.

8. The electronic device of claim 1, wherein the context information comprises at least one of a time, a place, a point of interest (POI), or a user tag related to each of the plurality of contents.

9. The electronic device of claim 1,
wherein the at least one first content is of the designated type, and
wherein the highlight section is the section of the at least one first content in which a change of at least one of an action, a gesture, an emotion, or a sound is detected.

10. The electronic device of claim 9, wherein the instructions, when executed by the at least one processor, further cause the electronic device to:
extract the highlight section from the at least one first content; and
generate the highlight content by combining and editing the highlighted section.

11. An operating method of an electronic device, the method comprising:
acquiring a plurality of contents related to a first category;
classifying the plurality of contents into one or more groups, based on context information of the plurality of contents;
identifying, from the one or more groups, at least one first content corresponding to a designated type of content, the designated type being a video format in which a highlight section is identified;
generating a highlight content by extracting a section from the at least one first content;
generating a feed comprising the highlighted content and the plurality of contents, based on the one or more classified groups;
determining a priority of each of the one or more classified groups based on content generated times, a highest priority determined for a group including an earliest content generated time; and
arranging the highlight content on an upper end of the feed for outputting on a display, based on the priority determined for the one or more classified groups, such that:
the plurality of contents are exposed subsequent to the highlight content;
the group having the highest priority is on an upper end position of the feed; and
a group having a lower priority is on a lower end position of the feed.

12. The method of claim 11, wherein classifying the plurality of contents into the one or more groups comprises:
classifying the plurality of contents into the one or more groups, based on a first context of the context information; and
classifying one or more contents included in each of the one or more groups into one or more sub-groups, based on a second context different from the first context of the context information.

13. The method of claim 12, wherein generating the feed comprising the highlight content and the plurality of contents comprises:
determining a priority of the one or more sub-groups, based on whether the at least one first content is included or a generated time; and
determining an arrangement order of the one or more sub-groups in one of the one or more groups according to the determined priority.

14. The method of claim 13, wherein determining the priority of the one or more sub-groups comprises:
identifying a first sub-group from the sub-groups, the first sub-group including an earliest generated time among the sub-groups and comprising the at least one first content; and
assigning a highest priority to the first sub-group.

15. The method of claim 14, wherein determining the priority of the one or more sub-groups comprises determining priorities of other sub-groups except for the first sub-group among the one or more sub-groups, based on the generated time.

16. The method of claim 13, wherein arranging the highlight content on the upper end of the feed for outputting on the display comprises determining a layout for the one or more contents included in the one or more sub-groups, based on the determined arrangement order and a content characteristic, and
wherein the content characteristic comprises at least one of a type, a shape, a ratio of a content, a content identifier, or a number of contents included in the sub-groups.

17. The method of claim 16, wherein arranging the highlight content on the upper end of the feed for outputting on the display comprises arranging the plurality of contents on positions subsequent to the highlight content in the feed, based on the determined arrangement order and the determined layout.

18. The method of claim 11, wherein the context information comprises at least one of a time, a place, a point of interest (POI), or a user tag related to each of the plurality of contents.

19. The method of claim 11,
wherein the at least one first content is of the designated type, and
wherein the highlight section is the section of the at least one first content in which a change of at least one of an action, a gesture, an emotion, or a sound is detected.

20. The method of claim 19, wherein generating the highlight content comprises:
extracting the highlight section from the at least one first content; and
generating the highlight content by combining and editing the highlighted section.

* * * * *